(12) United States Patent
Uto et al.

(10) Patent No.: US 12,252,824 B2
(45) Date of Patent: Mar. 18, 2025

(54) NONWOVEN FABRIC, METHOD FOR MANUFACTURING SAME, AND COMPOSITION FOR ELECTROSPINNING

(71) Applicants: NATIONAL INSTITUTE FOR MATERIALS SCIENCE, Tsukuba (JP); NIPPON ZOKI PHARMACEUTICAL CO., LTD., Osaka (JP)

(72) Inventors: Koichiro Uto, Tsukuba (JP); Mitsuhiro Ebara, Tsukuba (JP); Mitsuru Naiki, Kato (JP); Takafumi Konishi, Osaka (JP); Hitoshi Yamamoto, Ono (JP)

(73) Assignees: NATIONAL INSTITUTE FOR MATERIALS SCIENCE, Tsubaka (JP); NIPPON ZOKI PHARMACEUTICAL CO., LTD., Osaka (JP)

( * ) Notice: Subject to any disclaimer, the term of this patent is extended or adjusted under 35 U.S.C. 154(b) by 592 days.

(21) Appl. No.: 17/257,043

(22) PCT Filed: Jul. 9, 2019

(86) PCT No.: PCT/JP2019/027201
§ 371 (c)(1),
(2) Date: Dec. 30, 2020

(87) PCT Pub. No.: WO2020/013199
PCT Pub. Date: Jan. 16, 2020

(65) Prior Publication Data
US 2021/0140081 A1 May 13, 2021

(30) Foreign Application Priority Data

Jul. 9, 2018 (JP) .................................. 2018-129589
Apr. 12, 2019 (JP) .................................. 2019-076599

(51) Int. Cl.
*D04H 1/728* (2012.01)
*C08L 67/04* (2006.01)
(Continued)

(52) U.S. Cl.
CPC .............. *D04H 1/728* (2013.01); *C08L 67/04* (2013.01); *D01D 5/0007* (2013.01); *D01F 6/62* (2013.01);
(Continued)

(58) Field of Classification Search
CPC .......... D04H 1/728; D04H 1/55; D04H 1/435; C08L 67/04; D01D 5/0007; D01F 6/625; D01F 6/62; D10B 2331/04; D10B 2401/12
See application file for complete search history.

(56) References Cited

U.S. PATENT DOCUMENTS 5,753,781 A * 5/1998 Oxman .................... A61K 6/90
523/120
6,126,528 A * 10/2000 Sedlock .............. B24B 13/0057
451/384
(Continued)

FOREIGN PATENT DOCUMENTS

JP 10158485 * 6/1998
JP 2002-242051 A 8/2002
(Continued)

OTHER PUBLICATIONS

Jun. 29, 2022 extended Search Report issued in European Patent Application No. 19833180.3.
(Continued)

Primary Examiner — Jeffrey M Wollschlager
(74) Attorney, Agent, or Firm — Oliff PLC

(57) ABSTRACT

A non-woven fabric including fibers including an aliphatic polyester that has at least two maximum values in a molecu-
(Continued)

lar weight distribution thereof, wherein the fibers have a fiber diameter falling within the range of 100 to 3000 nm. The non-woven fabric of the present invention has excellent biodegradability.

12 Claims, 23 Drawing Sheets

(51) Int. Cl.
  *D01D 5/00* (2006.01)
  *D01F 6/62* (2006.01)
  *D04H 1/435* (2012.01)
  *D04H 1/55* (2012.01)
(52) U.S. Cl.
  CPC ............ *D01F 6/625* (2013.01); *D04H 1/435* (2013.01); *D04H 1/55* (2013.01); *D10B 2331/04* (2013.01); *D10B 2401/12* (2013.01)

(56) References Cited

U.S. PATENT DOCUMENTS

| | | | |
|---|---|---|---|
| 6,515,054 B1* | 2/2003 | Matsushita | C08L 67/04 524/167 |
| 8,236,904 B2 | 8/2012 | Andjelic et al. | |
| 2004/0166758 A1* | 8/2004 | Reichmann | D04H 3/16 442/361 |
| 2006/0142505 A1* | 6/2006 | Umemoto | C08L 67/04 525/437 |
| 2008/0233162 A1 | 9/2008 | Lee et al. | |
| 2009/0118241 A1* | 5/2009 | Andjelic | C08L 67/04 514/159 |
| 2009/0274742 A1* | 11/2009 | Brown | A61L 31/041 424/602 |
| 2011/0144751 A1 | 6/2011 | Brown et al. | |
| 2011/0236974 A1* | 9/2011 | Ogle | C07K 14/78 524/21 |
| 2013/0315963 A1 | 11/2013 | Erneta et al. | |
| 2015/0126091 A1* | 5/2015 | Kamann | D04H 1/435 442/361 |
| 2015/0151023 A1 | 6/2015 | Brown et al. | |
| 2015/0174287 A1 | 6/2015 | Steiger et al. | |
| 2015/0174288 A1 | 6/2015 | Jamiolkowski et al. | |
| 2016/0038645 A1* | 2/2016 | Pereira Matrins | A61L 15/64 514/420 |
| 2016/0263287 A1* | 9/2016 | Zhang | A61L 31/06 |
| 2018/0021485 A1* | 1/2018 | Nishikawa | A61K 9/70 424/426 |
| 2019/0083415 A1* | 3/2019 | Tanaka | A61K 38/18 |

FOREIGN PATENT DOCUMENTS

| | | |
|---|---|---|
| JP | 2004-290133 A | 10/2004 |
| JP | 2009-507530 A | 2/2009 |
| JP | 2009-511092 A | 3/2009 |
| JP | 2010-535861 A | 11/2010 |
| JP | 2014-004705 A | 1/2014 |
| JP | 2015-525255 A | 9/2015 |
| KR | 10-0762255 B1 | 10/2007 |
| KR | 10-2014-0004277 A | 1/2014 |

OTHER PUBLICATIONS

Sep. 24, 2019 International Search Report issued in International Patent Application No. PCT/JP2019/027201.
Jan. 12, 2021 International Preliminary Report on Patentability issued in International Patent Application No. PCT/JP2019/027201.
Jan. 6, 2025 Notice of Allowance in Korean Application No. 10-2020-7036059.

* cited by examiner

NONWOVEN FABRIC, METHOD FOR MANUFACTURING SAME, AND COMPOSITION FOR ELECTROSPINNING

TECHNICAL FIELD

The present invention relates to a non-woven fabric, a method for producing a non-woven fabric, and a composition for electrospinning.

BACKGROUND ART

A method for forming a non-woven fabric comprising ultrafine fibers by employing an electrospinning method is known. Also the development of a technique for forming the ultrafine fibers using a biodegradable polymer and using the ultrafine fibers for medical purposes has been progressing.

Patent Document 1 discloses "a stacked non-woven fabric comprising a plurality of long-fiber non-woven fabrics which are stacked on each other while partially heat-fusing the long-fiber non-woven fabrics to each other, wherein each of the long-fiber non-woven fabrics has such a structure that a fiber structure layer (A) which is composed of long fibers made from a biodegradable polymer and has a bulk density of 150 to 200 kg/m$^3$ is continuously compounded with a fiber structure layer (B) which is composed of long fibers made from a biodegradable polymer and has a bulk density of 5 to 30 kg/m$^3$".

PRIOR ART DOCUMENTS

Patent Document

Patent Document 1: Japanese Patent Laid-Open No. 2014-4705

SUMMARY OF THE INVENTION

Problem to be Solved by the Invention

The present inventors have made studies, and have found that the non-woven fabric disclosed in Patent Document 1 has room for improvement in biodegradability. In these situations, the present invention addresses the problem of providing a non-woven fabric having excellent biodegradability.

The present invention also addresses the problem of providing a method for producing a non-woven fabric and a composition for electrospinning.

Means for Solving the Problems

The present inventors have made extensive and intensive studies for the purpose of solving the problems. As a result, it is found that the problems can be solved by the following configurations.

[1] A non-woven fabric comprising a fiber including an aliphatic polyester that has at least two maximum values in a molecular weight distribution thereof,
wherein the fiber has a fiber diameter falling within the range of 100 to 3000 nm.
[2] The non-woven fabric according to [1], wherein the aliphatic polyester has a maximum value in a region lying between a molecular weight of 1500 and a molecular weight of 7000.
[3] The non-woven fabric according to [1] or [2], wherein the aliphatic polyester has a maximum value in a region lying between a molecular weight of 40000 and a molecular weight of 90000.
[4] The non-woven fabric according to [1] or [2], wherein the aliphatic polyester has a maximum value in a region lying between a molecular weight of 40000 and a molecular weight of 150000.
[5] The non-woven fabric according to any one of [1] to [4], wherein any polymeric compound other than the aliphatic polyester is not substantially contained.
[6] The non-woven fabric according to any one of [1] to [5], wherein the non-woven fabric is produced by electrospinning a composition containing aliphatic polyesters having different maximum values from each other in molecular weight distributions thereof.
[7] The non-woven fabric according to [6], wherein, when an aliphatic polyester having a maximum value positioned on a lowest molecular weight side among the aliphatic polyesters contained in the composition is defined as a lower-molecular-weight component and an aliphatic polyester having a maximum value positioned on a highest molecular weight side among the aliphatic polyesters contained in the composition is defined as a higher-molecular-weight component, a content mass ratio of a content of the lower-molecular-weight component to a sum total of the content of the lower-molecular-weight component and a content of the higher-molecular-weight component in the composition is more than 0.33 and less than 0.75.
[8] The non-woven fabric according to [6], wherein, when an aliphatic polyester having a maximum value positioned on a lowest molecular weight side among the aliphatic polyesters contained in the composition is defined as a lower-molecular-weight component and an aliphatic polyester having a maximum value positioned on a highest molecular weight side among the aliphatic polyesters contained in the composition is defined as a higher-molecular-weight component, a content mass ratio of a content of the lower-molecular-weight component to a sum total of the content of the lower-molecular-weight component and a content of the higher-molecular-weight component in the composition is 0.05 or more and less than 0.75.
[9] The non-woven fabric according to [6], wherein, when an aliphatic polyester having a maximum value positioned on a lowest molecular weight side among the aliphatic polyesters contained in the composition is defined as a lower-molecular-weight component and an aliphatic polyester having a maximum value positioned on a highest molecular weight side among the aliphatic polyesters contained in the composition is defined as a higher-molecular-weight component, a content mass ratio of a content of the lower-molecular-weight component to a sum total of the content of the lower-molecular-weight component and a content of the higher-molecular-weight component in the composition is 0.1 or more and less than 0.25.
[10] The non-woven fabric according to any one of [1] to [9], wherein the non-woven fabric further comprises a drug.
[11] A method for producing a non-woven fabric, comprising a step of electrospinning a composition which contains an aliphatic polyester having at least two maximum values in a molecular weight distribution thereof and a solvent to produce a non-woven fabric comprising a fiber including the aliphatic polyester and having a fiber diameter falling within the range of 100 to 3000 nm.
[12] The method for producing a non-woven fabric according to [11], comprising a step of mixing aliphatic polyesters having different maximum values from each other in molecular weight distributions thereof with the solvent to produce the composition.

[13] A composition for electrospinning, comprising an aliphatic polyester having at least two maximum values in a molecular weight distribution thereof and a solvent.

Advantages of the Invention

According to the present invention, a non-woven fabric having excellent biodegradability can be provided. According to the present invention, a method for producing a non-woven fabric and a composition for electrospinning can be provided.

MODE FOR CARRYING OUT THE INVENTION

Figure 1:
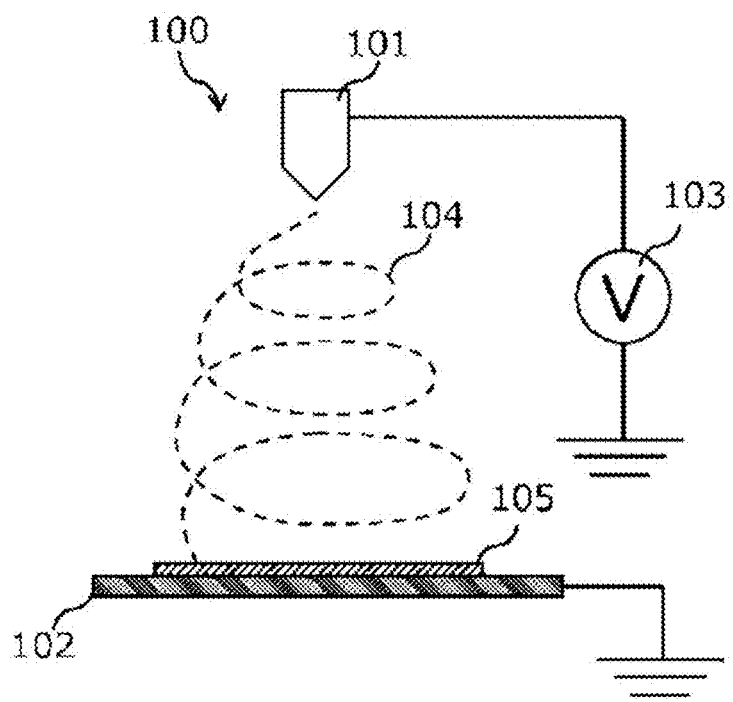
FIG. 1 is a schematic illustration of an electrospinning device.

Hereinbelow, the present invention will be described in detail.

The description about the constitutional requirements mentioned below is made on typical embodiments of the present invention. However, the present invention is not intended to be limited by these embodiments.

In the numerical value range expressed with a wording "to" as used herein refers to a range including numerical values described back and forth of the wording "to" as a lower limit value and an upper limit value, respectively.

In the expression "group (atom group)" in the description, a wording expressed without a term "substituted" or "unsubstituted" includes both of a group having no substituent and a group having a substituent as long as the effects of the present invention cannot be impaired. For example, the term "alkyl group" includes an alkyl group having no substituent (i.e., an unsubstituted alkyl group) as well as an alkyl group having a substituent (i.e., a substituted alkyl group). The same is applied to each compound.

The term "(meth)acrylate" as used herein refers to both or either one of "acrylate" and "methacrylate", and the term "(meth)acrylic" as used herein refers to both or either one of "acrylic" and "methacrylic". The term "(meth)acryloyl" refers to both or either one of "acryloyl" and "methacryloyl".

[Non-Woven Fabric]

The non-woven fabric according to the embodiment of the present invention is a non-woven fabric comprising fibers comprising an aliphatic polyester that has at least two maximum values in a molecular weight distribution thereof, wherein the fibers have a fiber diameter falling within the range of 100 to 3000 nm.

The term "non-woven fabric" as used herein refers to a sheet-like member made from fibers, and typically refers to a web in which individual fibers are combined randomly and which does not have a repeating pattern as observed in a woven fabric or a knitted fabric. The individual fibers may have a stacked form, or the individual fibers may be fused to each other, or the form of the fibers may be a combination of these forms.

For example, in the case where a non-woven fabric is formed by employing an electrospinning method as mentioned below, the non-woven fabric is generally formed by stacking fibers spun from a composition for electrospinning on the main surface of a base material placed on an electrode.

In the case where the composition for electrospinning contains a solvent, in the fibers produced immediately after spinning, the solvent that remains in an extremely small amount in the fibers is rapidly evaporated at the stage where the fibers are stacked on the main surface of the base material. However, at the stage where the stacking of the fibers proceeds, the fibers may be fused to each other due to the relationship with the evaporation rate.

The non-woven fabric according to the embodiment of the present invention may have such a structure that the fibers constituting the non-woven fabric are stacked or such a structure that some of the fibers constituting the non-woven fabric may be fused to each other.

In the non-woven fabric according to the embodiment of the present invention, the fiber diameter of the fibers constituting the non-woven fabric is not particularly limited, as long as the fiber diameter falls within the range of 100 to 3000 nm. When the fiber diameter is 100 nm or more, the non-woven fabric can have excellent structural stability. When the fiber diameter is 3000 nm or less, the non-woven fabric can have excellent flexibility, excellent biodegradability and excellent drug release properties.

The term "fiber diameter of fibers" as used herein refers to an average fiber diameter of fibers in a non-woven fabric, wherein the average fiber diameter is determined by observing the non-woven fabric with a scanning electron microscope and arithmetically averaging the widths of 10 or 100 fibers in a direction approximately orthogonal to the direction of the length of the fibers.

The thickness of the non-woven fabric is not particularly limited, and may be selected appropriately depending on the intended use of the non-woven fabric. For example, the thickness is preferably 1 to 1000 μm, more preferably 10 to 500 μm. The term "thickness of a non-woven fabric" as used herein refers to a value which is determined by measuring the thickness of a circular non-woven fabric having a diameter of about 1.2 cm at three points using a micrometer and then arithmetically averaging the measurement values. The mass of the non-woven fabric per unit area is not particularly limited, and may be selected appropriately depending on the intended use of the non-woven fabric.

[Fibers]

The non-woven fabric according to the embodiment of the present invention is formed from fibers. As mentioned above, the fiber diameter of the fibers is 100 to 3000 nm as measured by a specific method.

<Aliphatic Polyester>

The fibers comprise an aliphatic polyester having a specified molecular weight distribution.

Examples of the aliphatic polyester include: a poly(glycolic acid) such as poly(α-hydroxy acid); a poly(w-hydroxyalkanoate) such as poly(c-caprolactone) and poly(β-propiolactone); and poly-3-hydroxypropionate, poly-3-hydroxybutyrate, poly-3-hydroxycaproate, poly-3-hydroxyheptanoate and poly-3-hydrdoxyoctanoate.

In addition, a copolymer of each of the above-mentioned compounds with poly-3-hydroxyvalerate or poly-4-hydroxybutyrate may also be used. Specific examples include poly(β-hydroxyalkanoate), polylactic acid and a copolymer of polylactic acid. In addition, a condensation polymer of glycol and a dicarboxylic acid can also be used. Specific examples of the condensation polymer include polyethylene oxalate, polyethylene succinate, polyethylene adipate, polyethylene azelate, polybutylene oxalate, polybutylene succinate, polybutylene sebacate, polyhexamethylene sebacate, polyneopentyl oxalate, and copolymers thereof.

In addition, a condensation copolymer of the aliphatic polyester and an aliphatic polyamide, such as an aliphatic polyester amide copolymer, can also be used. Specific examples of the condensation copolymer include polycapramide (nylon 6), polytetramethylene adipamide (nylon 46), polyhexamethylene adipamide (nylon 66), polyundecaneamide (nylon 11), and polylaurolactamide (nylon 12).

In addition, a compound produced using an arbitrary diol, hydroxy acid, dicarboxylic acid or the like as a polymerization initiator for the aliphatic polyester can also be used. Specific examples of the compound include: poly(c-caprolactone) diol produced using propylene glycol or diethylene glycol as a polymerization initiator; and a poly(lactic acid-dicarboxylic acid) produced using fumaric acid as a polymerization initiator.

Among these compounds, from the viewpoint that a non-woven fabric having more excellent effects of the present invention can be produced, the aliphatic polyester is preferably a polymer having a repeating unit represented by formula (1) or (2), more preferably a polymer composed of the repeating unit represented by formula (1) or (2).

[Chemical formula 1]

(1)

[Chemical formula 2]

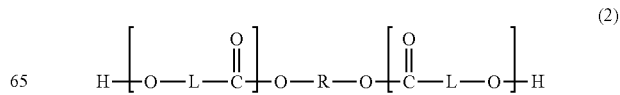

(2)

In formulae (1) and (2), L represents an alkylene group (preferably having 1 to 20 carbon atoms) which may have a branched structure or an alkenylene group (preferably having 1 to 20 carbon atoms) which may have a branched structure, more preferably an alkylene group which may have a branched structure.

In formulae (2), R represents an alkylene group (preferably having 1 to 20 carbon atoms) which may have a branched structure or an alkenylene group (preferably having 1 to 20 carbon atoms) which may have a branched structure, may have a branched structure, and is more preferably an alkylene group. Each of the structures represented by these formulae may have an ester bond, an amide bond, an ether bond or the like in the structure thereof.

The melting point of a crystal of the aliphatic polyester is not particularly limited. From the viewpoint that a non-woven fabric having more excellent effects of the present invention can be produced, the melting point is preferably 250° C. or lower, more preferably 180° C. or lower, still more preferably 100° C. or lower, particularly preferably 70° C. or lower. The lower limit value of the melting point is not particularly limited, and is generally preferably 30° C. or higher.

The term "melting point of a crystal of the aliphatic polyester" as used herein refers to a melting point measured by a differential scanning calorimeter (DSC).

The aliphatic polyester has at least two maximum values in the molecular weight distribution thereof. The term "molecular weight distribution" as used herein refers to a molecular weight distribution obtained by comparing with poly(ethylene glycol)/poly(ethylene oxide) standards employing gel permeation chromatography (GPC) using THF as a mobile phase.

The aliphatic polyester to be contained in the fibers has at least two maximum values in the molecular weight distribution thereof, wherein the values of the maximum values (i.e., peaks in the molecular weight distribution) are different from each other.

In other words, the aliphatic polyester has at least two peaks (maximum values), and therefore has at least two peaks, i.e., a peak positioned on a lowest molecular weight side (also referred to as "peak A", hereinafter) and a peak positioned on a highest molecular weight side (also referred to as "peak B", hereinafter).

It is assumed that a component having a relatively small molecular weight which constitutes the peak A of the aliphatic polyester can further decrease the melting point of the aliphatic polyester and/or can further reduce the crystallinity of the aliphatic polyester fibers. As a result, the non-woven fabric according to the embodiment of the present invention can have excellent biodegradability.

On the other hand, a component having a relatively high molecular weight which constitutes the peak B of the aliphatic polyester can improve the mechanical properties of the non-woven fabric.

In general, it is believed that, when a higher-molecular-weight component and a lower-molecular-weight component are contained in fibers, the lower-molecular-weight component tends to be localized on the surfaces of the fibers.

The non-woven fabric according to the embodiment of the present invention is composed of fibers each comprising an aliphatic polyester containing both of a lower-molecular-weight component and a higher-molecular-weight component. It is assumed that at least a portion of the lower-molecular-weight component is localized on the surfaces of the fibers as mentioned above and therefore the decomposition of the fibers (the non-woven fabric) tends to occur from the surfaces thereof.

In particular, the non-woven fabric according to the embodiment of the present invention is formed from fibers having a very small diameter and therefore has a large surface area due to the structure of the fibers. Accordingly, the non-woven can exert the above-mentioned effects significantly.

Unlike the conventional fibers or the like which are prepared by blending a lower-molecular-weight plasticizer component to a polymeric material, the aliphatic polyester is a polymer in which the lower-molecular-weight component and the higher-molecular-weight component are of the same type as each other. Therefore, it is considered that these components have high affinity for each other, the lower-molecular-weight component can be distributed sufficiently in a region other than the surfaces of the fibers and, as a result, the degree of crystallization of the fibers tends to become smaller as a whole.

As mentioned above, it is assumed that the non-woven fabric according to the embodiment of the present invention can have more superior biodegradability than ever due to a synergistic effect among the factors including the large surface area of the fibers, the ease of decomposition of the fibers from the surfaces of the fibers due to the presence of the lower-molecular-weight component and the ease of decomposition of the fibers in a whole due to the deterioration in the degree of crystallinity.

The molecular weight at the peak A is not particularly limited. From the viewpoint that a non-woven fabric having more excellent biodegradability can be produced, the molecular weight can be 1000 to 10000 in terms of a number average molecular weight. The lower limit of the molecular weight may be 1500 or more, 2000 or more, or 2500 or more. The upper limit of the molecular weight may be 9000 or less, 8000 or less, 7000 or less, 6000 or less, 5000 or less, 4000 or less, or 3000 or less.

The molecular weight at the peak B is not particularly limited. From the viewpoint that a non-woven fabric having more excellent mechanical strength can be obtained, the molecular weight can be, for example, 30000 to 200000 in terms of a number average molecular weight. The upper limit of the molecular weight may be 190000 or less, 180000 or less, 170000 or less, 160000 or less, 150000 or less, 140000 or less, 130000 or less, 120000 or less, or 110000 or less. The lower limit of the molecular weight may be 40000 or more, 50000 or more, 60000 or more, 70000 or more, or 80000 or more.

The aliphatic polyester may have three or more maximum values in the molecular weight distribution thereof, wherein the upper limit value of the number of the maximum values is not particularly limited. In the case where the aliphatic polyester has three or more maximum values, it is preferred that each of the molecular weight of the peak A and the molecular weight of the peak B respectively fall within the above-mentioned ranges.

The content of the aliphatic polyester in the fibers is not particularly limited. From the viewpoint that a non-woven fabric having more excellent biodegradability and more excellent biocompatibility can be produced, the content is preferably 0.01 to 100% by mass relative to the entire mass of the fibers.

The fibers may contain a polymer other than the aliphatic polyester. However, from the viewpoint that a non-woven fabric having more excellent biodegradability can be produced, it is preferred that any polymer other than the aliphatic polyester is not substantially contained.

The wording "any polymer other than the aliphatic polyester is not substantially contained" means that the fibers does not contain any polymer other than the aliphatic polyester or the content of the aliphatic polyester in the fibers is less than 0.01% by mass relative to the entire mass of the fibers.

The fibers may contain only a single aliphatic polyester, or may contain two or more aliphatic polyesters in combination. In the case where the fibers contain two or more aliphatic polyesters, it is preferred that the total content of these aliphatic polyesters falls within the above-mentioned range.

It is also preferred that each of the aliphatic polyesters has at least two maximum values in the molecular weight distribution thereof. The type of the maximum values is as mentioned above.

When the fibers do not contain any polymer other than the aliphatic polyester, the non-woven fabric can have more excellent biodegradability, although the mechanism of the action is not known in detail.

Particularly from the viewpoint that a non-woven fabric that is further superior in the effects of the present invention can be produced, it is preferred that the non-woven fabric is produced by electrospinning a composition containing aliphatic polyesters having different maximum values from each other in the molecular weight distributions thereof.

In this regard, it is more preferred that the composition contains a component having a peak A positioned on a lowest molecular weight side (i.e., a lower-molecular-weight component) and a component having a peak B on a highest molecular weight side (i.e., a higher-molecular-weight component) which are mentioned above.

In the case where the composition contains the lower-molecular-weight component and the higher-molecular-weight component, the content mass ratio of the content of the lower-molecular-weight component to the sum total of the contents of the lower-molecular-weight component and the higher-molecular-weight component (wherein the ratio is also referred to as "A/(A+B)", hereinafter) is not particularly limited. The lower limit of the ratio is preferably 0.01 or more, 0.02 or more, 0.03 or more, 0.04 or more, 0.05 or more, 0.06 or more, 0.07 or more, 0.08 or more, 0.09 or more, or 0.10 or more. The upper limit of the ratio is preferably 0.80 or less, more preferably 0.75 or less, still more preferably less than 0.75. The upper limit may be 0.60 or less, 0.50 or less, 0.40 or less, 0.30 or less, or 0.20 or less.

When the A/(A+B) value is less than 0.75, the non-woven fabric can have more excellent uniformity (in other words, fiber width uniformity).

The A/(A+B) value is determined by rounding off to two decimal places.

<Other Components>

The fibers may contain other component than the above-mentioned components. One example of the other component is a drug. When the non-woven fabric containing a drug is applied to a medical device that is indwelled in a living body or is inserted into a living body upon use, the non-woven fabric can release the drug into the living body upon the decomposition of the non-woven fabric. In the case where the non-woven fabric is applied to a medical device of this type, the non-woven fabric containing a drug can be prepared in such a form that the shape of the non-woven fabric can be retained for a desired period of time in a living body and can be decomposed completely after a lapse of a desired period of time. The period for which the shape of the non-woven fabric is retained in a living body may be, for example, about one month, about two months, about three months, about four months, about five months or about six months. The period of time until the time when the non-woven fabric is completely decomposed may be, for example, about six months, about seven months, about eight months, about nine months, about ten months, about eleven months, or about twelve months. The content ratios of the lower-molecular-weight component and the higher-molecular-weight component can be varied appropriately depending on the type of the drug to be used or the intended use of the drug.

In the case where it is requested that the period of release of the drug is short, the "A/(A+B)" value is not particularly limited, and the lower limit of the value is preferably 0.10 or more, more preferably 0.30 or more, still more preferably 0.33 or more, particularly preferably more than 0.33. When the A/(A+B) value is more than 0.33, the non-woven fabric can have more excellent biodegradability.

In the case where it is requested that the period of release of the drug is long, the "A/(A+B)" value is not particularly limited, and is preferably 0.01 or more, 0.02 or more, 0.03 or more, 0.04 or more, 0.05 or more, 0.06 or more, 0.07 or more, 0.08 or more, or 0.09 or more, more preferably 0.10 or more and less than 0.25. When the A/(A+B) value is 0.10 or more and less than 0.25, the drug contained in the non-woven fabric can be released for a long period and the non-woven fabric can have more excellent uniformity (in other words, uniformity in fiber width).

The type of the drug is not particularly limited, and examples of the drug include a therapeutic agent for nerve Injuries, an anti-cancer agent, an immunosuppressing agent, an antibiotic, an anti-rheumatic agent, an anti-thrombotic drug, an HMG-CoA reductase inhibitor, an ACE inhibitor, an angiotensin II receptor blocker, an NO donor, a calcium channel blocker, an anti-hyperlipidemic drug, an anti-inflammatory agent, an Integrin inhibitor, an anti-allergic agent, an antioxidant agent, a GPIIbIIIa blocker, a retinoid, a flavonoid, a carotenoid, a lipid improving drug, a DNA synthesis inhibitor, a tyrosine kinase inhibitor, an anti-platelet agent, a vascular smooth muscle growth inhibitor, a blood vessel contrast agent, an interferon, a growth factor and a combination thereof.

The fibers may contain only a single drug, or may contain two or more drugs in combination.

An example of the therapeutic agent for nerve Injuries is vitamin B12. Examples of vitamin B12 include cobalamin and derivatives thereof. Specific examples of vitamin B12 include methylcobalamin, cyanocobalamin, hydroxocobalamin, sulphitocobalamin, adenosylcobalamin and salts thereof. Among these compounds, methylcobalamin, cyanocobalamin, hydroxocobalamin or a salt thereof is preferred, and methylcobalamin or a salt thereof is more preferred. In the case where the non-woven fabric of the present application is intended to be indwelled in a living body, the content of vitamin B12 can be, for example, such an amount that the final concentration becomes about 1% to about 30%, preferably about 2% to about 10%.

[Method for Producing Non-Woven Fabric]

The method for producing the non-woven fabric according to the embodiment of the present invention is not particularly limited, and any known method can be employed. Examples of the known method include an electrospinning method, a melt-spinning method, a self-assembling method, a template synthesis method, an electroblowing method, and a forcespinning method. Among these methods, an electrospinning method is preferred from the viewpoint that a non-woven fabric having more excellent effects of the present invention can be produced.

In the electrospinning method, the composition for electrospinning is electrically charged by applying a high voltage to produce fibers, and then the fibers are stacked to produce a non-woven fabric. The method for electrically charging the composition for electrospinning is preferably carried out by connecting a power supply to the composition for electrospinning or a container containing the composition for electrospinning and then applying a voltage of typically preferably 1 to 100 kV, more preferably 5 to 50 kV The type of the voltage may be either one of a direct current type and an alternating current type.

The temperature to be employed for the electrospinning is not particularly limited. In the case where it is intended to produce the non-woven fabric using a composition for electrospinning containing a solvent as mentioned below, the temperature may be adjusted appropriately depending on the boiling point or volatility of the solvent contained in the composition for electrospinning. As one example, 10 to 30° C. is preferred.

The process for producing the non-woven fabric by an electrospinning method will be described using a typical electrospinning device shown in FIG. 1. An electrospinning device 100 is equipped with an ejection device 101 and a target electrode 102 that is arranged so as to face the ejection device 101. The ejection device 101 is so configured as to eject the composition for electrospinning. When the composition for electrospinning is ejected from the ejection device 101 while applying a voltage between the ejection device 101 and the target electrode 102 using a voltage application device 103, a fiber 104 is formed during the movement of the composition for electrospinning from the ejection device 101 toward the target electrode 102 and the fiber is stacked on the target electrode 102 to produce a non-woven fabric 105.

[Composition for Electrospinning]

The composition for electrospinning which can be used in the case where it is intended to produce the non-woven fabric according to the embodiment of the present invention by an electrospinning method is not particularly limited. From the viewpoint that a non-woven fabric having more excellent effects of the present invention can be produced, it is preferred that the composition contains an aliphatic polyester having at least two maximum values in the molecular weight distribution thereof and a solvent.

(Aliphatic Polyester)

The aliphatic polyester to be contained in the composition for electrospinning is only required to have at least two maximum values in the molecular weight distribution thereof, and the type thereof is as described above with respect to the aliphatic polyester to be contained in the fibers constituting the non-woven fabric.

The aliphatic polyester having at least two maximum values in the molecular weight distribution thereof can be typically obtained by mixing aliphatic polyesters having different maximum values from each other with each other.

In other words, an aliphatic polyester having peaks A and B can be obtained by mixing an aliphatic polyester that has the peak A with an aliphatic polyester that is of the same type of the aforementioned aliphatic polyester and has the peak B.

In the case where the composition for electrospinning contains an aliphatic polyester that has a peak A (i.e., a lower-molecular-weight component) and an aliphatic polyester that is of the same type as the aforementioned aliphatic polyester and has a peak B (i.e., a higher-molecular-weight component), the upper limit of the content mass ratio (A/(A+B)) of the content of the lower-molecular-weight component to the total of the contents of the lower-molecular-weight component and the higher-molecular-weight component in the composition for electrospinning is not particularly limited, and is preferably 0.80 or less, more preferably 0.75 or less, still more preferably less than 0.75. When the (A/(A+B)) ratio falls within the above-mentioned numerical value range, it becomes possible to produce a non-woven fabric having more excellent uniformity.

The lower limit of the (A/(A+B)) value is not particularly limited, and may be 0.01 or more, 0.02 or more, 0.03 or more, or 0.04 or more. From the viewpoint that a non-woven fabric having more excellent effects of the present invention can be produced, the lower limit is preferably 0.05 or more, 0.06 or more, 0.07 or more, 0.08 or more, 0.09 or more, or 0.10 or more.

The content of the aliphatic polyester in the composition for electrospinning is not particularly limited. From the viewpoint that a non-woven fabric having more excellent effects of the present invention can be produced, the content is preferably 0.1 to 50% by mass, more preferably 1 to 30% by mass, relative to the entire mass of the composition for electrospinning.

(Solvent)

The composition for electrospinning preferably contains a solvent. The solvent is not particularly limited. Examples of the solvent include acetone, chloroform, ethanol, isopropanol, methanol, toluene, tetrahydrofuran, water, benzene, benzyl alcohol, 1,4-dioxane, propanol, carbon tetrachloride, cyclohexane, cyclohexanone, dichloromethane, phenol, pyridine, trichloroethane, acetic acid, N,N-dimethylformamide (DMF), dimethyl sulfoxide (DMSO), N,N-dimethylacetamide (DMAc), 1-methyl-2-pyrrolidone (NMP), ethylene carbonate (EC), propylene carbonate (PC), dimethyl carbonate (DMC), acetonitrile (AN), N-methylmorpholine-N-oxide, butylene carbonate (BC), 1,4-butyrolactone (BL), diethyl carbonate (DEC), diethyl ether (DEE), 1,2-dimethoxyethane (DME), 1,3-dimethyl-2-imidazolidinone (DMI), 1,3-dioxolane (DOL), ethyl methyl carbonate (EMC), methyl formate (MF), 3-methyloxazolidin-2-one (MO), methyl propionate (MP), 2-methyltetrahydrofuran (MeTHF), sulfolane (SL), trifluoroethanol (TFE), 1,1,1,3,3,3-hexafluoro-2-propanol (HFIP), xylene, methylcyclohexane, decahydronaphthalene (Decalin), methyl ethyl ketone (MEK) and dichlorobenzene (DCB). These solvents may be used singly, or a mixture of two or more of them may be used.

For the purpose of modifying an electrical conductivity, a viscosity or the like, various additives may be used.

The content of the solvent in the composition for electrospinning is not particularly limited. It is preferred that the content of the solvent is adjusted in such a manner that the solid content in the composition for electrospinning can become 0.1 to 30% by mass, more preferably 1 to 20% by mass.

(Other Components)

The composition for electrospinning may contain other components than the aliphatic polyester or the solvent. One example of the other components is a drug as mentioned above. The content of the drug in the composition for electrospinning is not particularly limited, and is preferably 0.1 to 30% by mass relative to the entire solid content in the composition for electrospinning.

[Use Applications of Non-Woven Fabric]

The non-woven fabric according to the embodiment of the present invention has excellent biodegradability, and therefore can be used as, for example, a scaffolding material for tissue regeneration use. In regenerative medicine, for the purpose of proliferating and differentiating cells to construct a three-dimensional biological-tissue-like structure, the non-woven fabric according to the embodiment of the present invention can be applied to, for example, a method in which the non-woven fabric is transplanted in the body of a patient to cause cells to invade into the non-woven fabric from a tissue or organ surrounding the non-woven fabric and the cells are proliferated and differentiated to regenerate the tissue or the organ.

On the other hand, when the fiber diameter of the non-woven fabric according to the embodiment of the present invention is decreased and the mass of the non-woven fabric per unit area is increased so that a body fluid can penetrate through the non-woven fabric from the surface thereof but any inflammatory cells (e.g., a macrophage) that can cause the scarring of tissues cannot be infiltrated into the non-woven fabric, the non-woven fabric can be applied to, for example, a method for protecting a tissue from a damage caused by inflammatory cells.

EXAMPLES

Hereinbelow, the present invention will be described in more detail by way of examples. The materials, the amounts used, the amount ratios, the contents of treatments, the procedures of treatments and the like mentioned in the following examples can be changed appropriately without departing from the spirit of the present invention. Therefore, it should be noted that the scope of the present invention is not limited by the following examples.

[Preparation of Non-Woven Fabric]

Example 1

A polycaprolactone having a number average molecular weight of 2000 (also referred to as "PCL (A)", hereinafter) and a polycaprolactone having a number average molecular weight of 80000 (also referred to as "PCL (B)", hereinafter) were provided, wherein the number average molecular weights were determined by gel permeation chromatography method.

The PCL (A) and the PCL (B) were dissolved in 1,1,1,3,3,3-hexafluoro-2-propanol (HFIP) to prepare a composition for electrospinning.

The preparation was carried out in such a manner that the contents of each of the PCL (A) and the PCL (B) in the composition for electrospinning was adjusted to 5% by mass relative to the entire mass of the composition for electrospinning.

The composition for electrospinning was spun using an electrospinning device shown in FIG. 1 to produce a sheet-like non-woven fabric.

Figure 2:
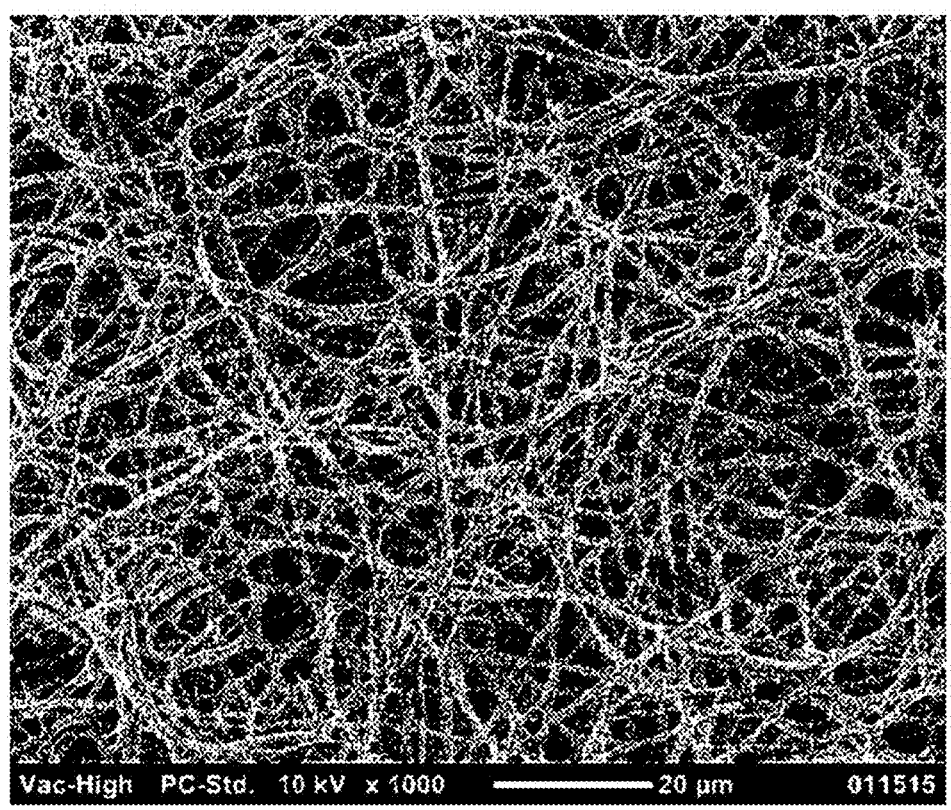
FIG. 2 is a scanning electron micrograph of a non-woven fabric of Example 1.

A needle (22 G) was used as an ejection device, the distance between the needle and a target electrode was 13 cm, and an ejection speed was 1.0 mL/h. The voltage to be applied was 20 kV. A scanning electron micrograph of the non-woven fabric thus produced is shown in FIG. 2. From FIG. 2, it was found that the fiber diameter of fibers constituting the non-woven fabric was 1136±39 nm.

The fiber diameter was determined by randomly extracting 100 fibers from a single field of view with a scanning electron microscope at a magnification of 1000× and then determining the widths (diameters) of the fibers using "Image J (software)".

Example 2

Figure 3:
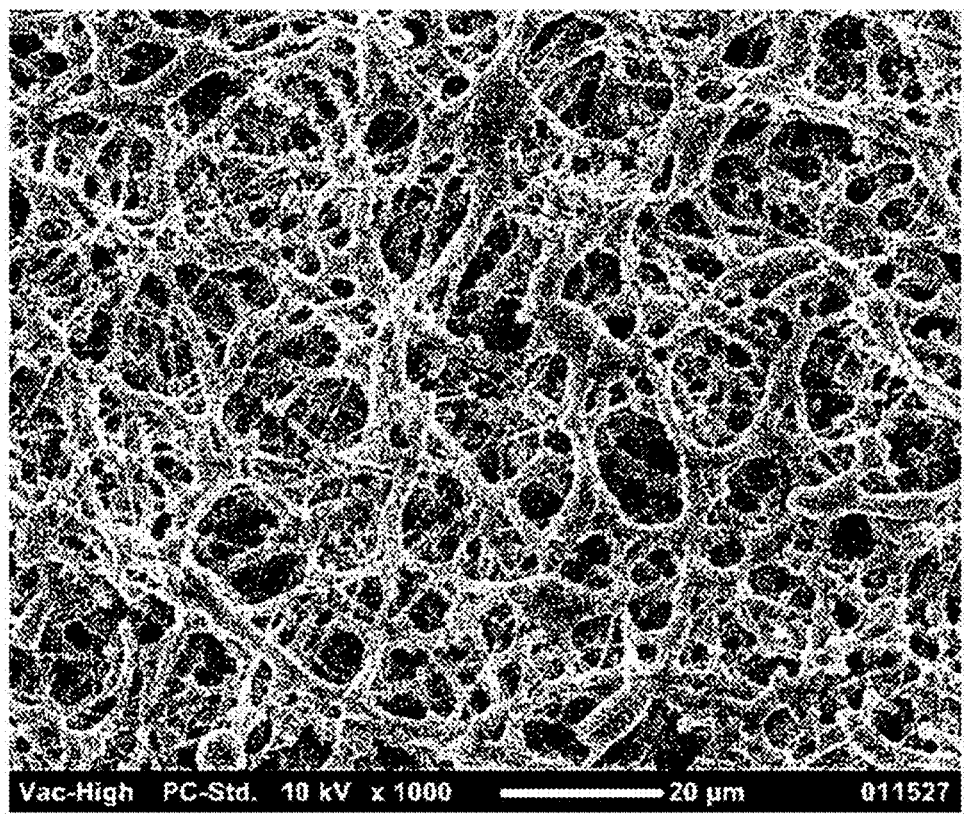
FIG. 3 is a scanning electron micrograph of a non-woven fabric of Example 2.

A composition for electrospinning was prepared in the same manner as in Example 1, except that the contents of the PCL (A) and the PCL (B) in the composition for electrospinning were 10% by mass and 5% by mass, respectively, relative to the entire mass of the composition for electrospinning and the remainder was made up by HFIP, and the composition was spun to produce a sheet-like non-woven fabric. A scanning electron micrograph of the non-woven fabric thus produced is shown in FIG. 3. From FIG. 3, it was found that the fiber diameter of fibers constituting the non-woven fabric was 2774±174 nm.

Comparative Example 1

Figure 4:
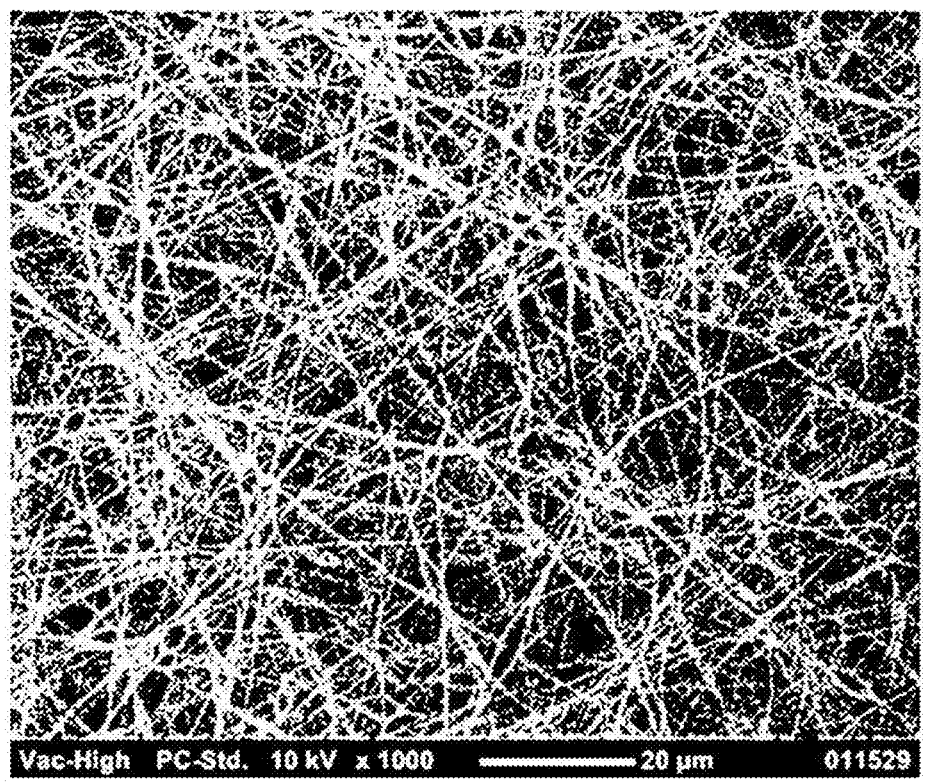
FIG. 4 is a scanning electron micrograph of a non-woven fabric of Comparative Example 1.

A composition for electrospinning was prepared in the same manner as in Example 1, except that the content of the PCL (A) in the composition for electrospinning was 0% by mass (i.e., without using the PCL (A)), the content of the PCL (B) in the composition for electrospinning was 5% by mass, and the remainder was made up by HFIP, and the composition was spun to produce a sheet-like non-woven fabric. A scanning electron micrograph of the non-woven fabric thus produced is shown in FIG. 4. From FIG. 4, it was found that the fiber diameter of fibers constituting the non-woven fabric was 736±46 nm.

[Evaluation of Biodegradability (37° C.)]

Each of the non-woven fabrics prepared above was cut into an approximately circular piece having a diameter of 1.2 cm to prepare a sample for biodegradability determination use (the thickness was 0.030±0.000 mm, and the mass was 1.3±0.10 mg). The sample was immersed in 1.5 mL of an aqueous NaOH (3M) solution, and the process of the decomposition of the sample under a constant temperature environment at 37° C. was observed.

Figure 5:
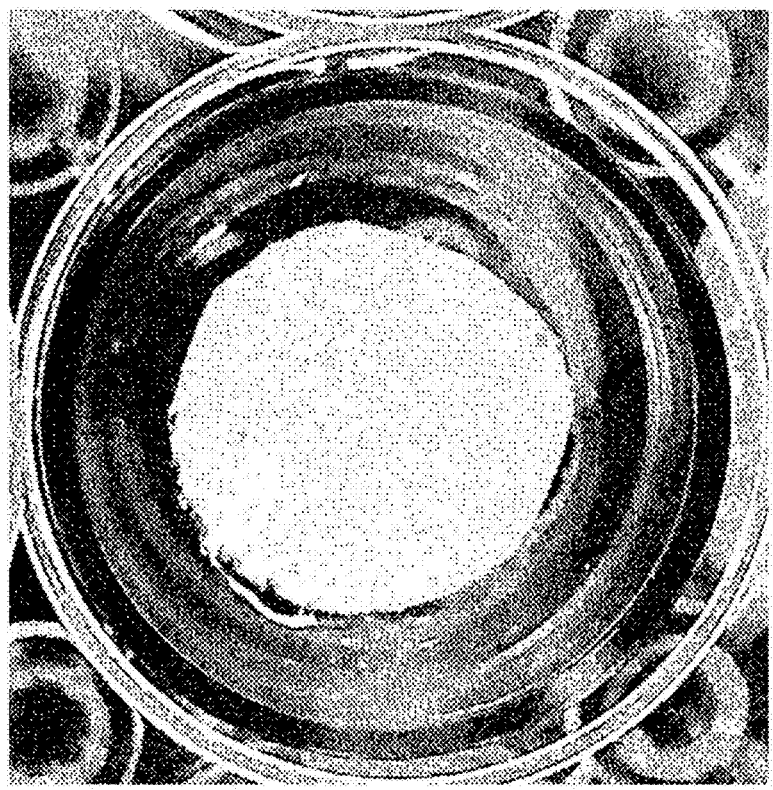
FIG. 5 is a photograph showing how the non-woven fabric of Example 1 is decomposed at 37° C. (immediately after the immersion).
Figure 6:
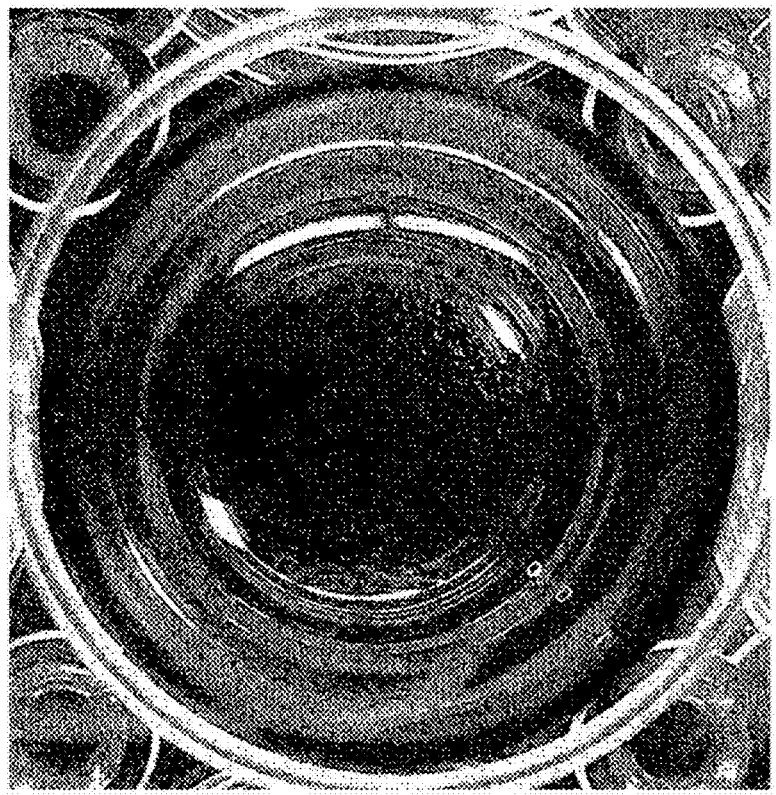
FIG. 6 is a photograph showing how the non-woven fabric of Example 1 is decomposed at 37° C. (after a lapse of 26 hours).
Figure 7:
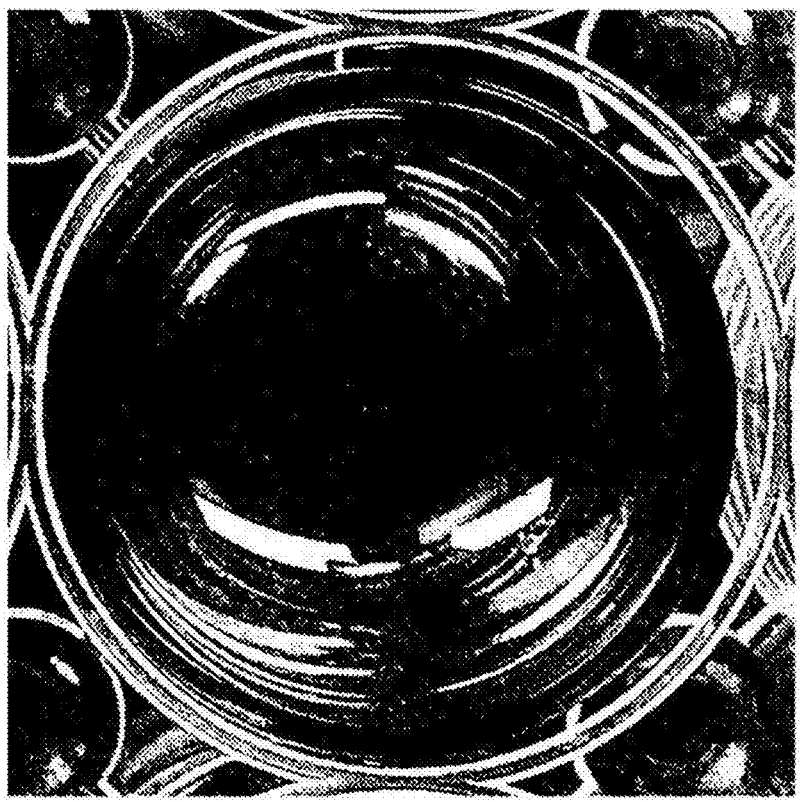
FIG. 7 is a photograph showing how the non-woven fabric of Example 1 is decomposed at 37° C. (after a lapse of 63 hours).

FIGS. 5 to 7 are photographs showing how the non-woven fabric of Example 1 was decomposed at 37° C.

FIG. 5 is a photograph showing the state of the non-woven fabric of Example 1 immediately after the immersion in the aqueous NaOH solution. FIG. 6 is a photograph showing the state of the non-woven fabric of Example 1 after the immersion in the aqueous NaOH solution and a lapse of 26 hours after the immersion. FIG. 7 is a photograph showing the state of the non-woven fabric of Example 1 after the immersion in the aqueous NaOH solution and a lapse of 63 hours after the immersion.

According to FIGS. 5 to 7, the non-woven fabric of Example 1 was sufficiently decomposed at 37° C. at the point of time after a lapse of 26 hours, and it was found that the non-woven fabric had excellent biodegradability.

Figure 8:
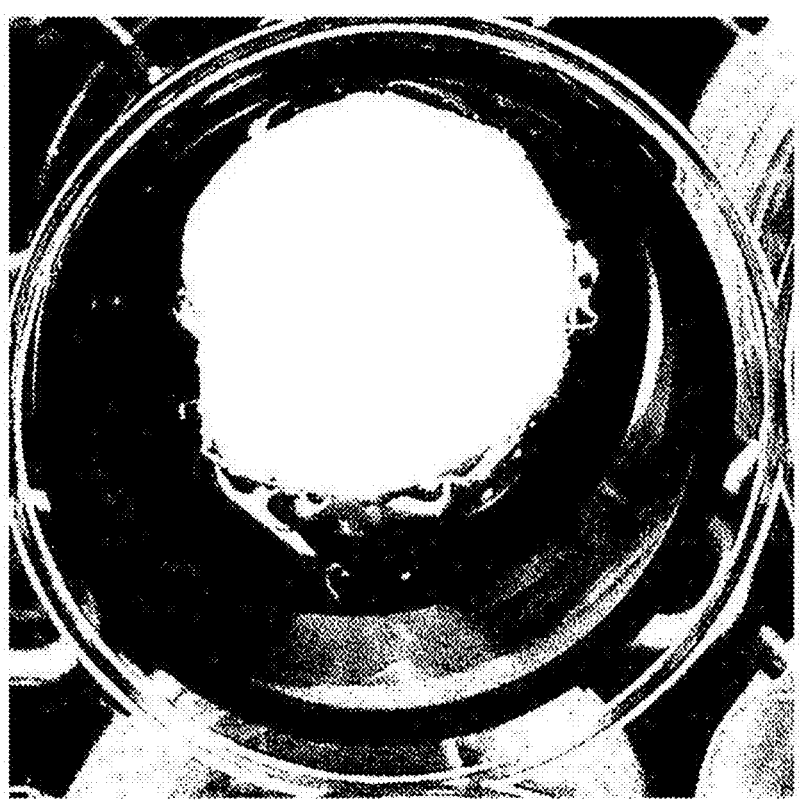
FIG. 8 is a photograph showing how the non-woven fabric of Example 2 is decomposed at 37° C. (immediately after the immersion).
Figure 9:
FIG. 9 is a photograph showing how the non-woven fabric of Example 2 is decomposed at 37° C. (after a lapse of 26 hours).
Figure 10:
FIG. 10 is a photograph showing how the non-woven fabric of Example 2 is decomposed at 37° C. (after a lapse of 63 hours).

FIGS. 8 to 10 are photographs showing how the non-woven fabric of Example 2 was decomposed at 37° C.

FIG. 8 is a photograph showing the state of the non-woven fabric of Example 2 immediately after the immersion in the aqueous NaOH solution. FIG. 9 is a photograph showing the state of the non-woven fabric of Example 2 after the immersion in the aqueous NaOH solution and a lapse of 26 hours after the immersion. FIG. 10 is a photograph showing the state of the non-woven fabric of Example 2 after the immersion in the aqueous NaOH solution and a lapse of 63 hours after the immersion.

According to FIGS. 8 to 10, the non-woven fabric of Example 2 was sufficiently decomposed at 37° C. at the point of time after a lapse of 26 hours, and it was demonstrated that the non-woven fabric had excellent biodegradability.

Figure 11:
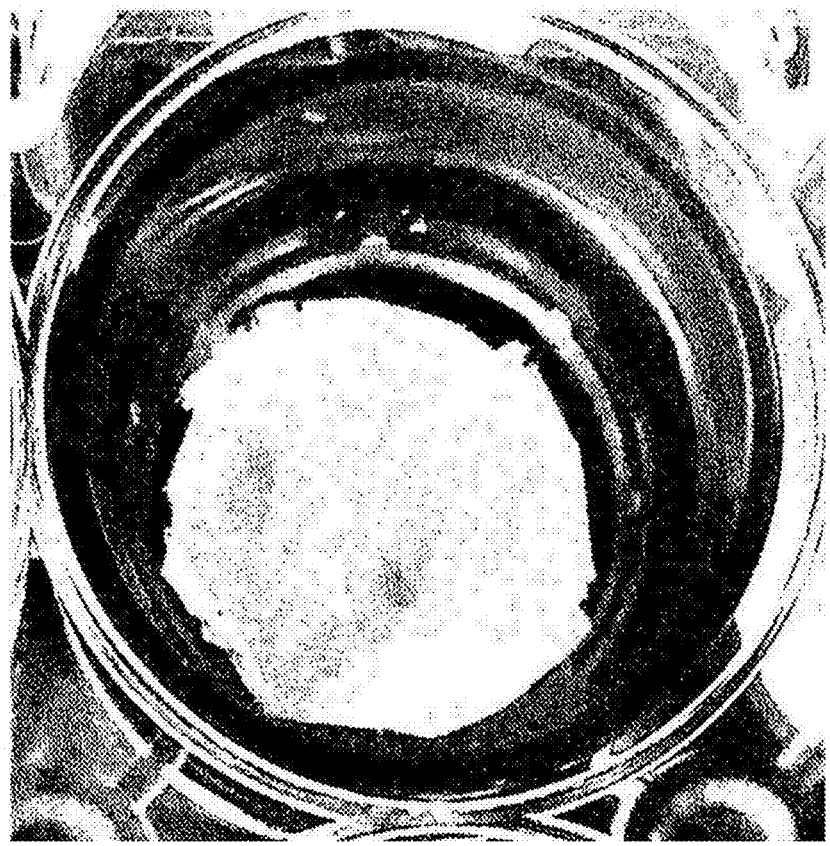
FIG. 11 is a photograph showing how the non-woven fabric of Comparative Example 1 is decomposed at 37° C. (immediately after the immersion).
Figure 12:
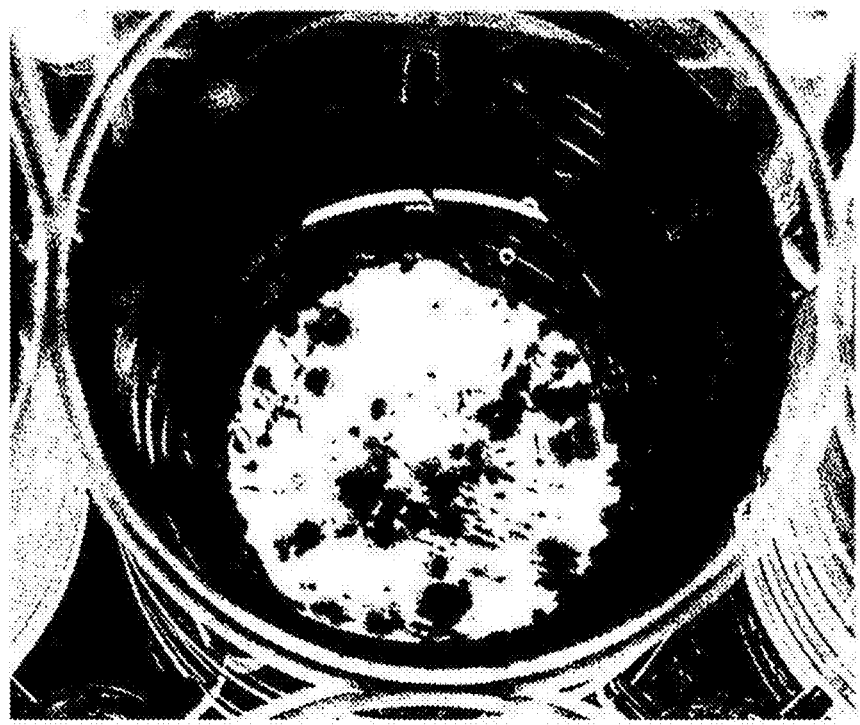
FIG. 12 is a photograph showing how the non-woven fabric of Comparative Example 1 is decomposed at 37° C. (after a lapse of 26 hours).
Figure 13:
FIG. 13 is a photograph showing how the non-woven fabric of Comparative Example 1 is decomposed at 37° C. (after a lapse of 63 hours).

FIGS. 11 to 13 are photographs showing how the non-woven fabric of Comparative Example 1 was decomposed at 37° C.

FIG. 11 is a photograph showing the state of the non-woven fabric of Comparative Example 1 immediately after the immersion in the aqueous NaOH solution. FIG. 12 is a photograph showing the state of the non-woven fabric of Comparative Example 1 after the immersion in the aqueous NaOH solution and a lapse of 26 hours after the immersion. FIG. 13 is a photograph showing the state of the non-woven fabric of Comparative Example 1 after the immersion in the aqueous NaOH solution and a lapse of 63 hours after the immersion.

According to FIGS. 11 to 13, the non-woven fabric of Comparative Example 1 was not sufficiently decomposed at 37° C. even after a lapse of 63 hours, and it was demonstrated that the biodegradability of the non-woven fabric was insufficient.

Figure 14:
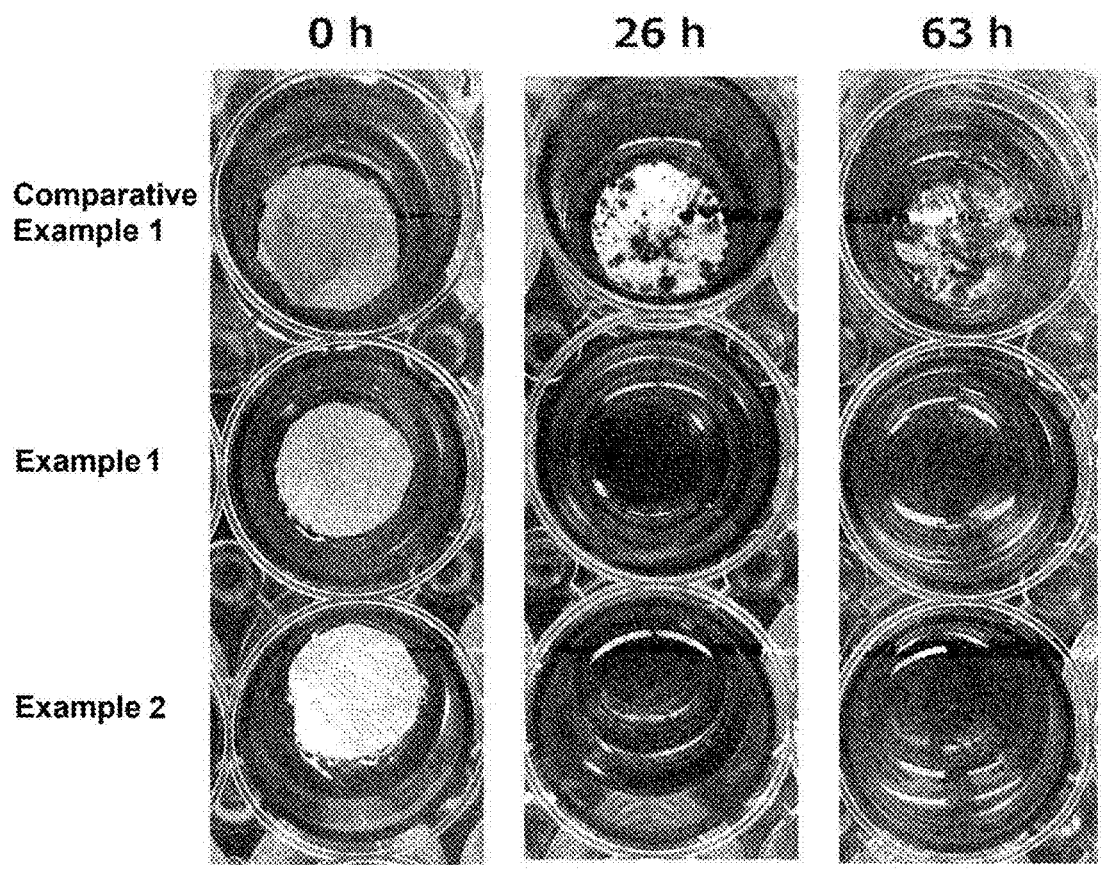
FIG. 14 is an illustration summarizing the processes of decomposition of each sample shown in FIGS. 5 to 13 in a single picture plane.

FIG. 14 is an illustration summarizing the processes of decomposition of each sample shown in FIGS. 5 to 13 in a single picture plane.

From the above-mentioned results, it was demonstrated that the non-woven fabrics of Examples 1 and 2 had excellent biodegradability. In contrast, the non-woven fabric of Comparative Example 1 did not have the desired effect of the present application.

[Evaluation of Biodegradability (Room Temperature)]

Each of the non-woven fabrics prepared above was cut into an approximately circular piece having a diameter of 1.2 cm to prepare a sample for biodegradability determination use (the thickness was 0.077±0.015 mm, the mass was 1.9±0.06 mg). The sample was immersed in 1.5 mL of an aqueous NaOH (3M) solution, and the process of decomposition of the sample under a constant temperature environment at room temperature (25° C.) was observed.

Figure 15:
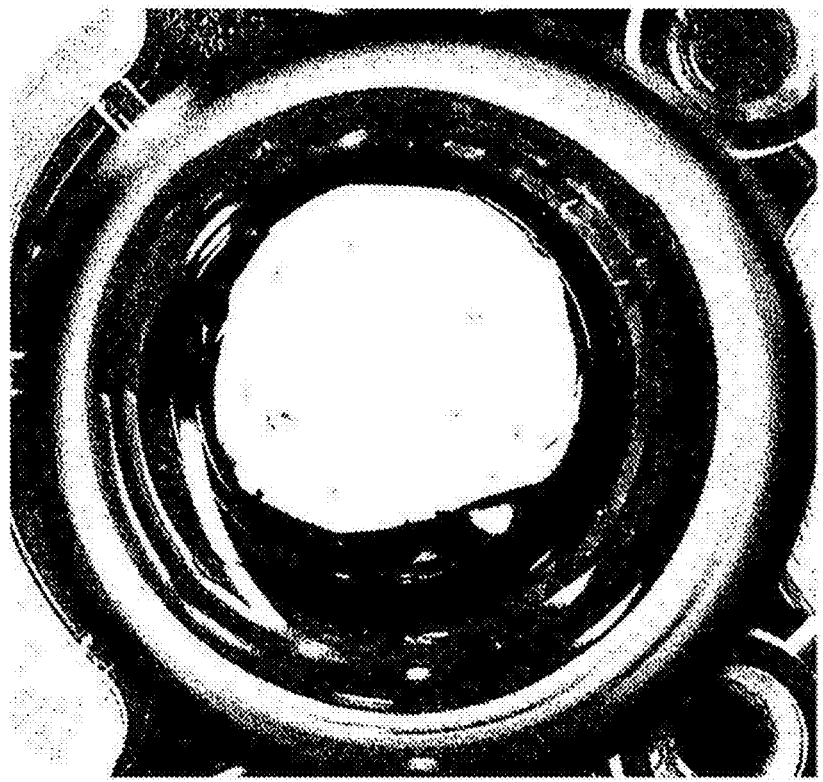
FIG. 15 is a photograph showing how the non-woven fabric of Example 1 is decomposed at room temperature (immediately after the immersion).
Figure 16:
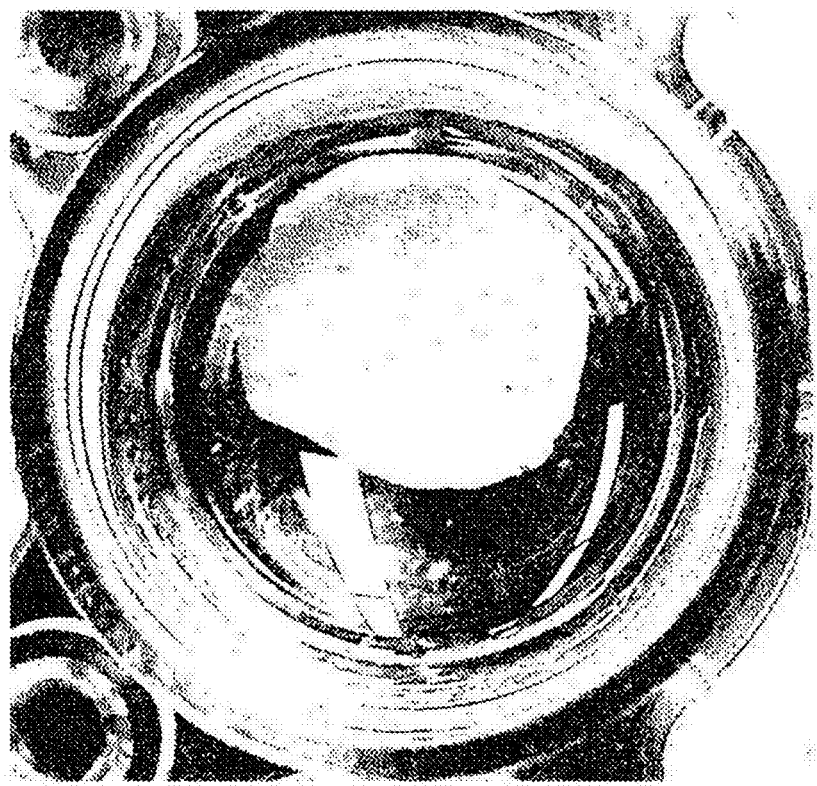
FIG. 16 is a photograph showing how the non-woven fabric of Example 1 is decomposed at room temperature (after a lapse of 11 hours).
Figure 17:
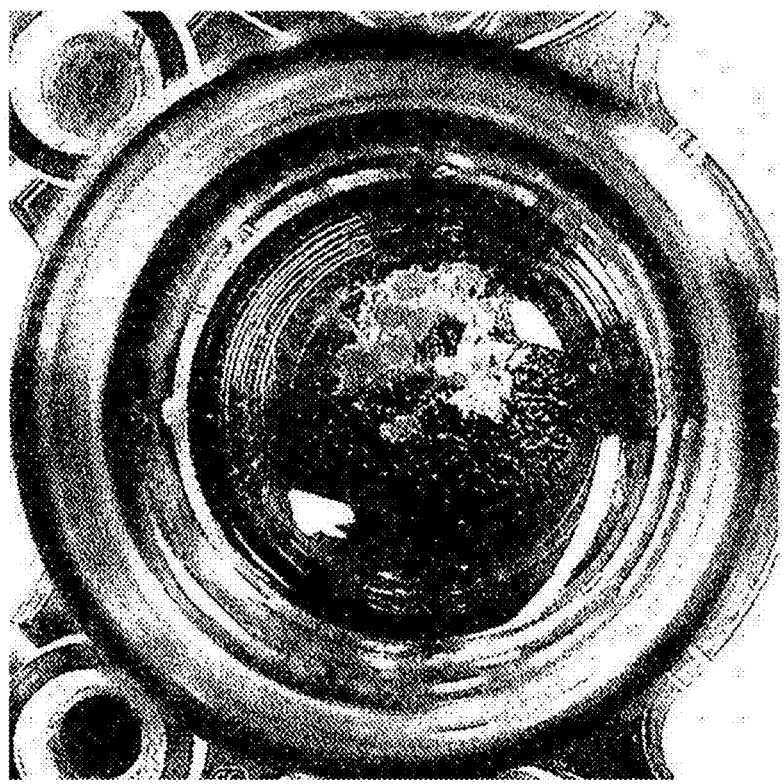
FIG. 17 is a photograph showing how the non-woven fabric of Example 1 is decomposed at room temperature (after a lapse of 38 hours).

FIGS. 15 to 17 are photographs showing how the non-woven fabric of Example 1 was decomposed at room temperature.

FIG. 15 is a photograph showing the state of the non-woven fabric of Example 1 immediately after the immersion in the aqueous NaOH solution. FIG. 16 is a photograph showing the state of the non-woven fabric of Example 1 after the immersion in the aqueous NaOH solution and a lapse of 11 hours after the immersion. FIG. 17 is a photograph showing the state of the non-woven fabric of Example 1 after the immersion in the aqueous NaOH solution and a lapse of 38 hours after the immersion.

According to FIGS. 15 to 17, it was demonstrated that, although the non-woven fabric of Example 1 had satisfactory biodegradability at room temperature, the non-woven fabric was not decomposed completely at the point of time after a lapse of 38 hours.

Figure 18:
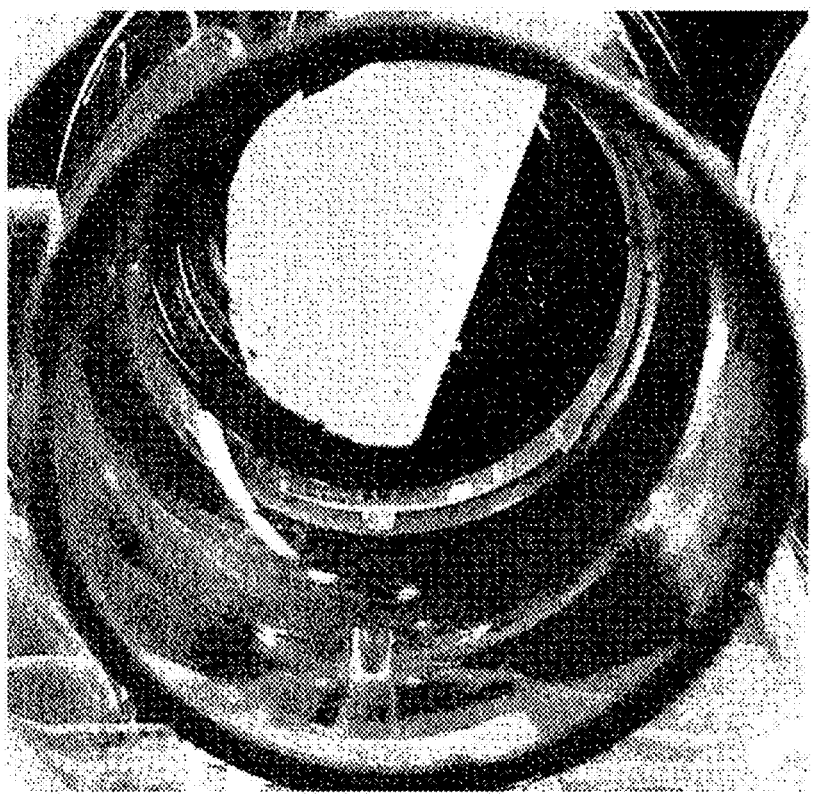
FIG. 18 is a photograph showing how the non-woven fabric of Example 2 is decomposed at room temperature (immediately after the immersion).
Figure 19:
FIG. 19 is a photograph showing how the non-woven fabric of Example 2 is decomposed at room temperature (after a lapse of 11 hours).
Figure 20:
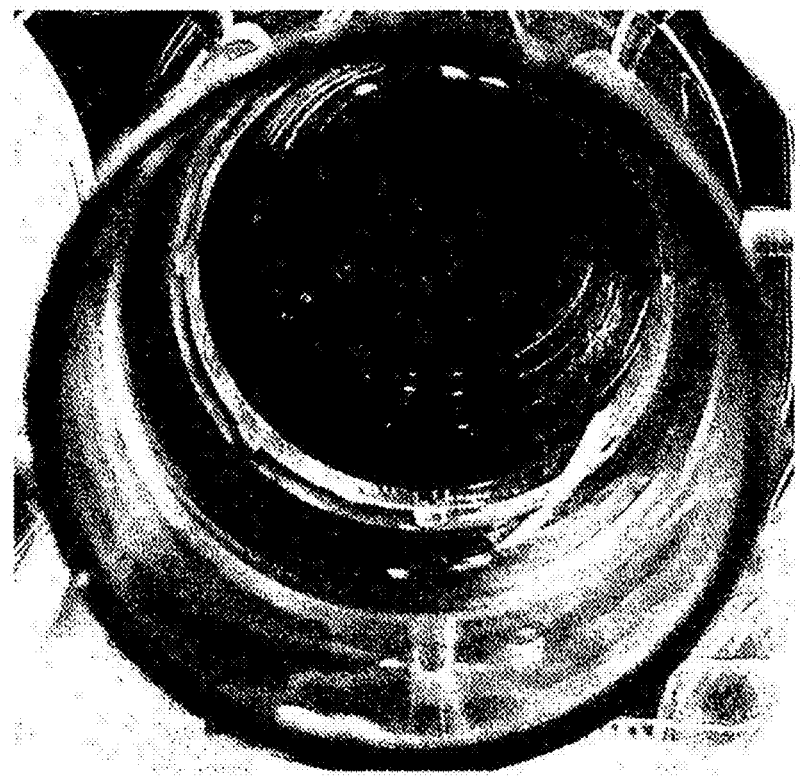
FIG. 20 is a photograph showing how the non-woven fabric of Example 2 is decomposed at room temperature (after a lapse of 38 hours).

FIGS. 18 to 20 are photographs showing how the non-woven fabric of Example 2 was decomposed at room temperature.

FIG. 18 is a photograph showing the state of the non-woven fabric of Example 2 immediately after the immersion in the aqueous NaOH solution. FIG. 19 is a photograph showing the state of the non-woven fabric of Example 2 after the immersion in the aqueous NaOH solution and a lapse of 11 hours after the immersion. FIG. 20 is a photograph showing the state of the non-woven fabric of Example 2 after the immersion in the aqueous NaOH solution and a lapse of 38 hours after the immersion.

According to FIGS. 18 to 20, it was demonstrated that the non-woven fabric of Example 2 also had satisfactory biodegradability at room temperature and was decomposed almost completely at the point of time after a lapse of 38 hours.

Figure 21:
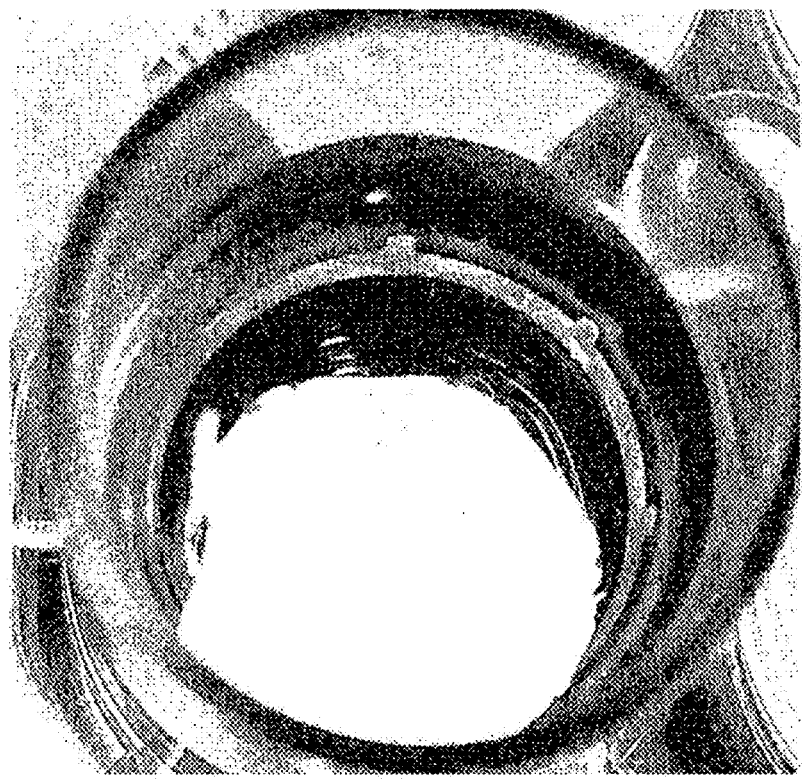
FIG. 21 is a photograph showing how the non-woven fabric of Comparative Example 1 is decomposed at room temperature (immediately after the immersion).
Figure 22:
FIG. 22 is a photograph showing how the non-woven fabric of Comparative Example 1 is decomposed at room temperature (after a lapse of 11 hours).
Figure 23:
FIG. 23 is a photograph showing how the non-woven fabric of Comparative Example 1 is decomposed at room temperature (after a lapse of 38 hours).

FIGS. 21 to 23 are photographs showing how the non-woven fabric of Comparative Example 1 was decomposed at room temperature.

FIG. 21 is a photograph showing the state of the non-woven fabric of Comparative Example 1 immediately after the immersion in the aqueous NaOH solution. FIG. 22 is a photograph showing the state of the non-woven fabric of Comparative Example 1 after the immersion in the aqueous NaOH solution and a lapse of 11 hours after the immersion. FIG. 23 is a photograph showing the state of the non-woven fabric of Comparative Example 1 after the immersion in the aqueous NaOH solution and a lapse of 38 hours after the immersion.

According to FIGS. 21 to 23, it was demonstrated that the non-woven fabric of Comparative Example 1 was decomposed to a very small extent at room temperature even after a lapse of 38 hours, and the biodegradability of the non-woven fabric was unsatisfactory.

Figure 24:
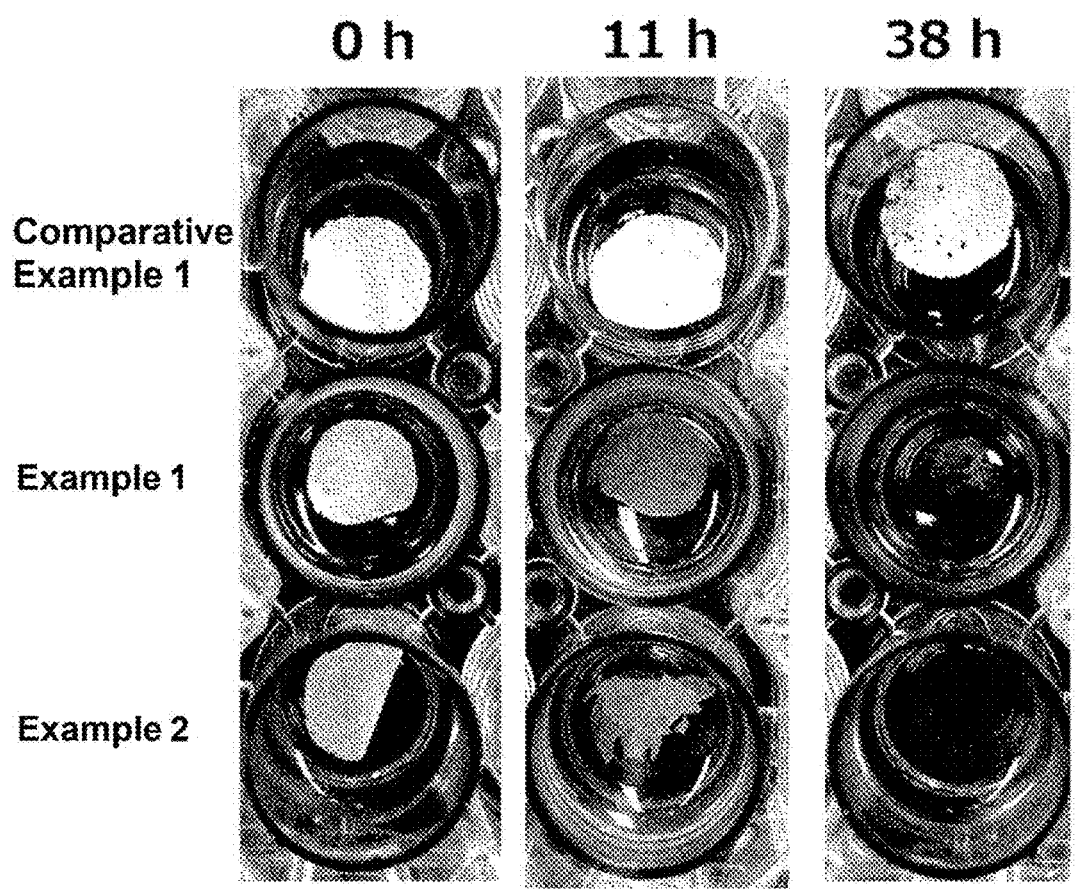
FIG. 24 is an illustration summarizing the processes of decomposition of the samples shown in FIGS. 15 to 23 in a single picture plane.

FIG. 24 is an illustration summarizing the processes of decomposition of the samples shown in FIGS. 15 to 23 in a single picture plane.

From the above-mentioned results, it was found that the non-woven fabrics of Examples 1 and 2 also had excellent biodegradability at room temperature. From the comparison with Example 1, it was found that Example 2 had more excellent biodegradability at room temperature.

In contrast, the non-woven fabric of Comparative Example 1 did not have the desired effect of the present application.

Examples 3 to 9

Non-woven fabrics were prepared in the same manner as in Example 1, except that compositions respectively having the component compositions shown in Table 1 were used as the compositions for electrospinning and the compositions for electrospinning were electrospun under the conditions shown in Table 1. The scanning electron micrographs of the non-woven fabrics are shown in FIGS. 25 to 31.

The non-woven fabrics of Examples 3 to 9 also had excellent biodegradability desired in the present application.

TABLE 1

Figure 25:
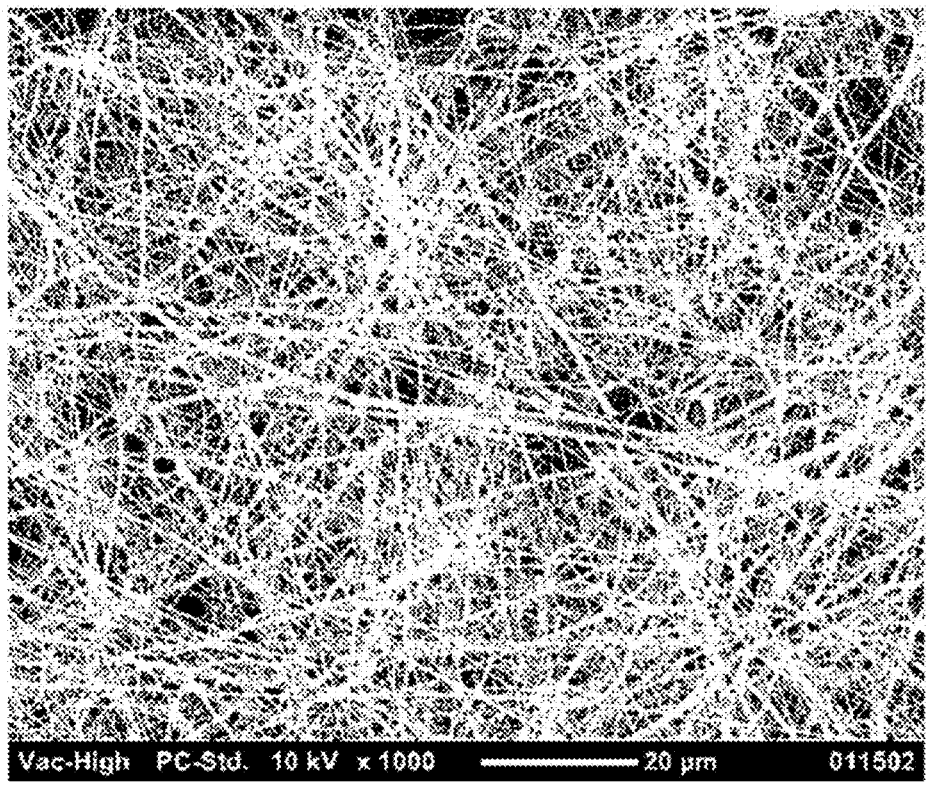
FIG. 25 is a scanning electron micrograph of a non-woven fabric of Example 3.
Figure 26:
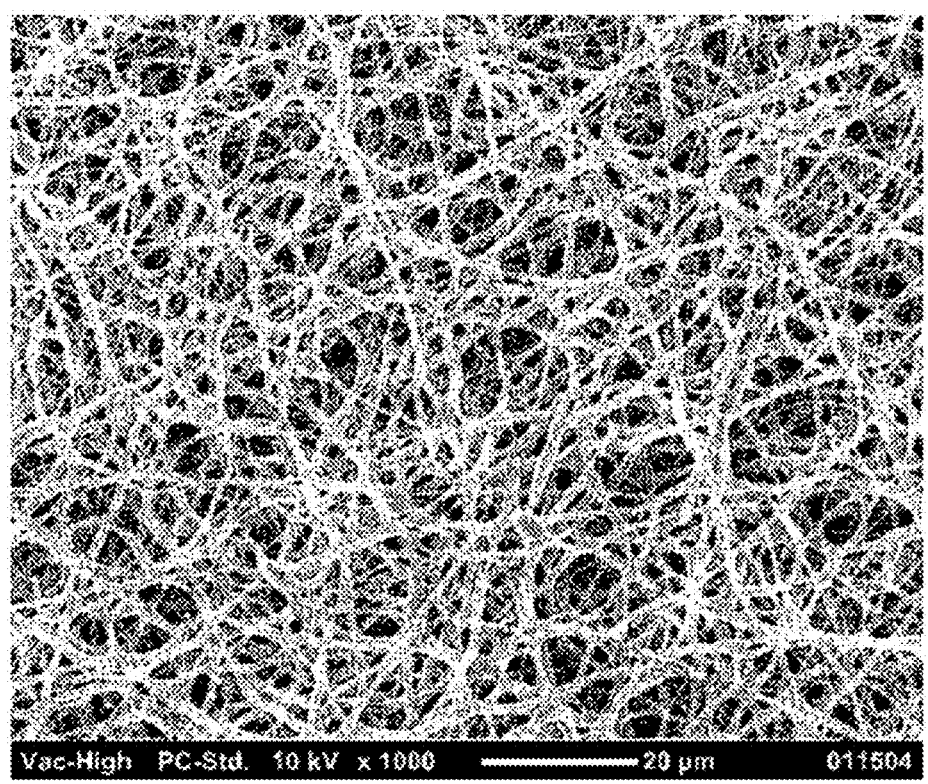
FIG. 26 is a scanning electron micrograph of a non-woven fabric of Example 4.
Figure 27:
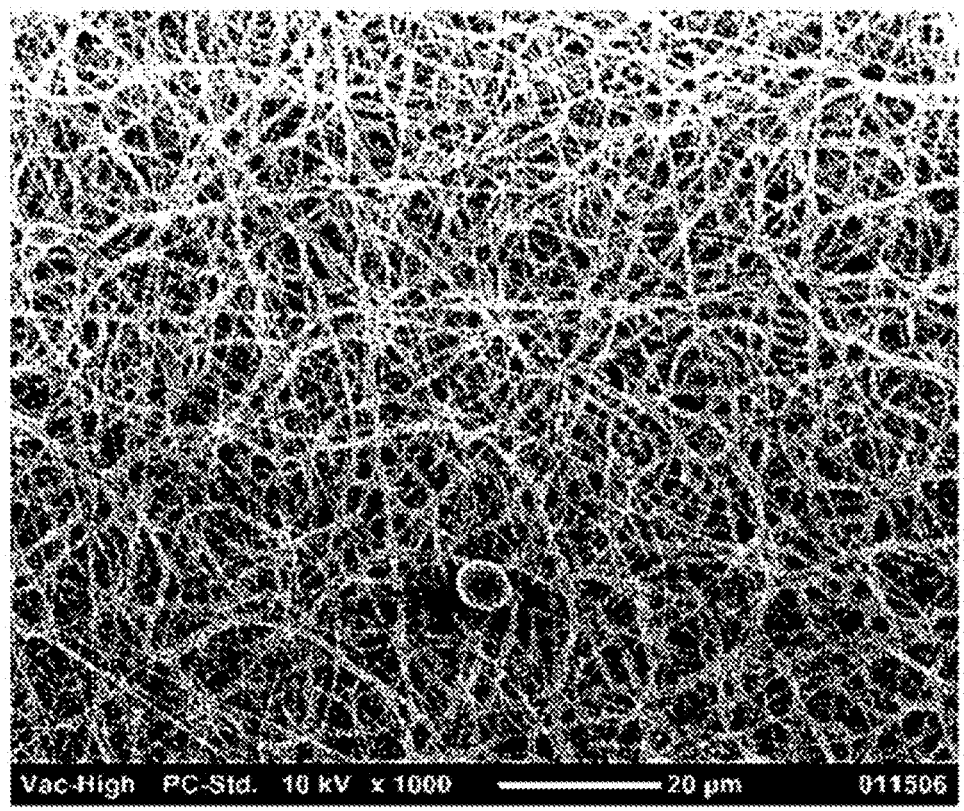
FIG. 27 is a scanning electron micrograph of a non-woven fabric of Example 5.
Figure 28:
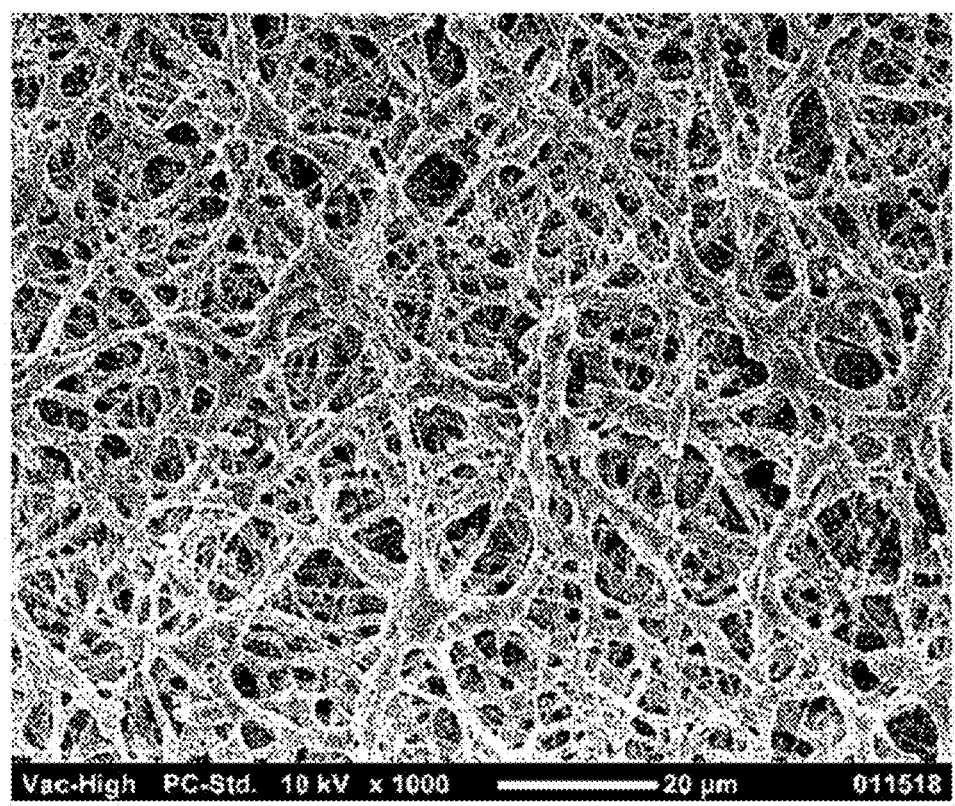
FIG. 28 is a scanning electron micrograph of a non-woven fabric of Example 6.
Figure 29:
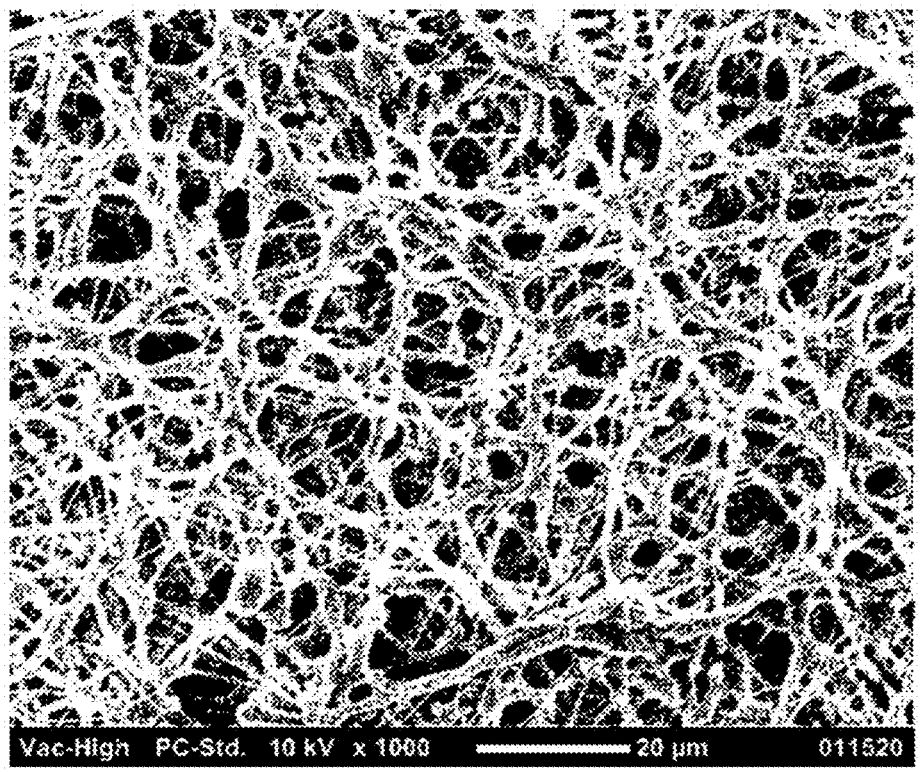
FIG. 29 is a scanning electron micrograph of a non-woven fabric of Example 7.
Figure 30:
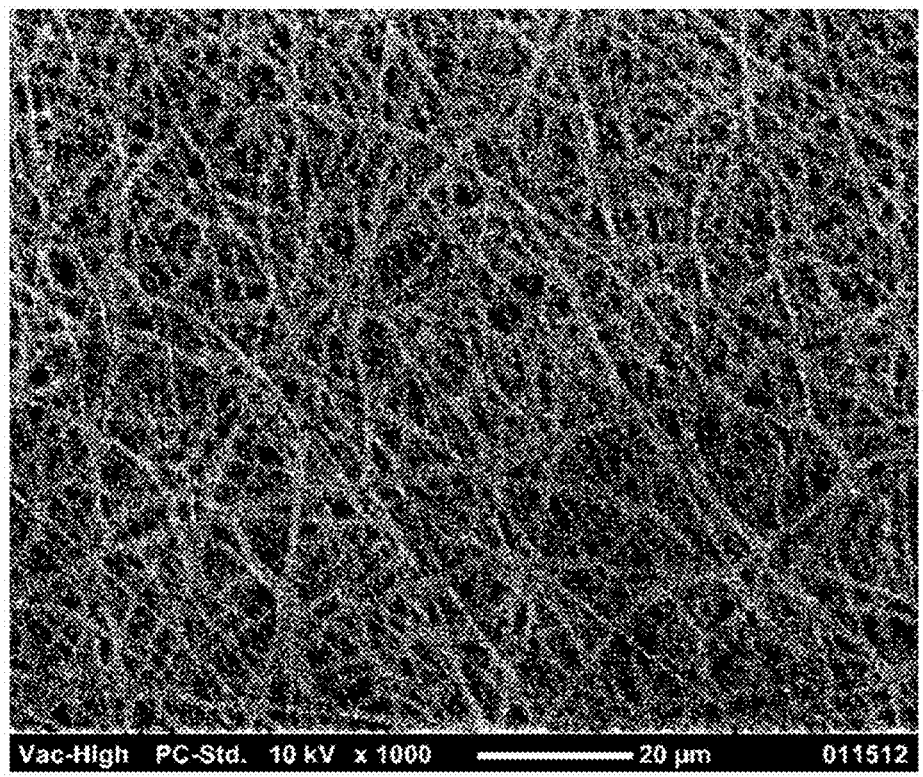
FIG. 30 is a scanning electron micrograph of a non-woven fabric of Example 8.
Figure 31:
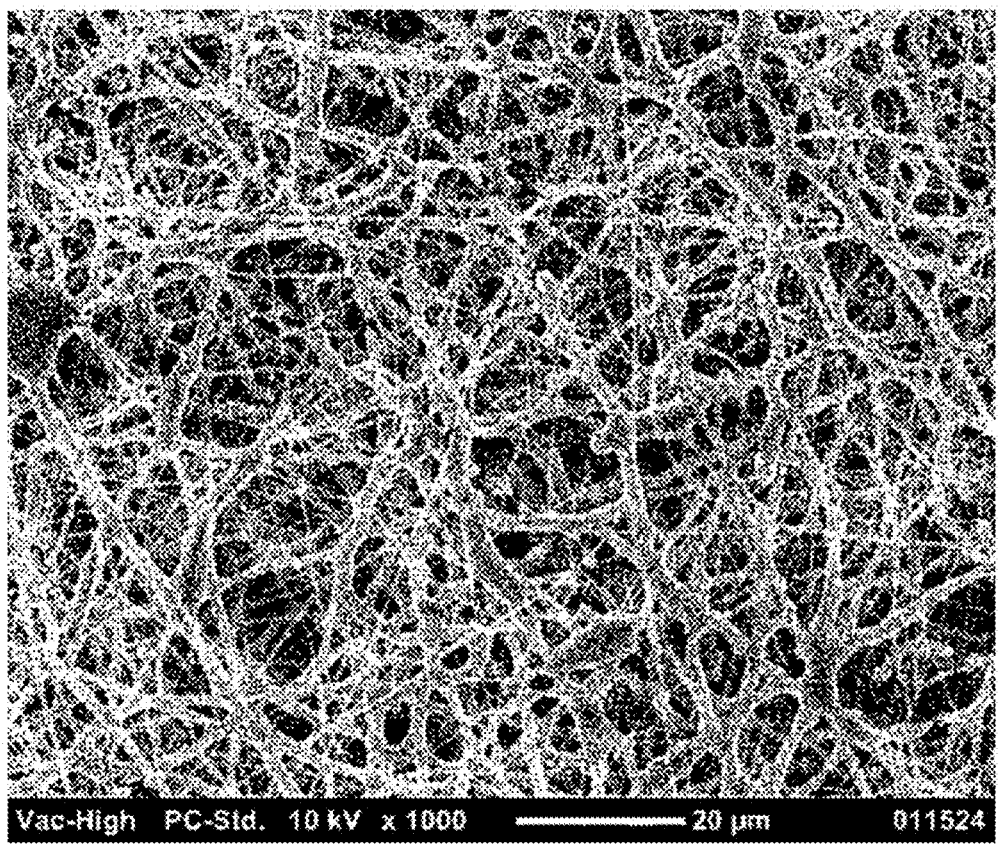
FIG. 31 is a scanning electron micrograph of a non-woven fabric of Example 9.

| | Composition for electrospinning | | | Conditions for electrospinning | | Drawing number of corresponding electron micrograph | Fiber diameter (nm) |
|---|---|---|---|---|---|---|---|
| | PCL (A) (% by mass) | PCL (B) (% by mass) | HFIP (% by mass) | Ejection speed (ml/h) | Voltage applied (kV) | | |
| Example 3 | 5 | 5 | Remainder | 0.5 | 10 | FIG. 25 | 593 ± 29 |
| Example 4 | 5 | 5 | Remainder | 0.5 | 20 | FIG. 26 | 1078 ± 38 |
| Example 5 | 5 | 5 | Remainder | 0.5 | 30 | FIG. 27 | 836 ± 43 |
| Example 6 | 10 | 5 | Remainder | 0.5 | 20 | FIG. 28 | 1885 ± 107 |
| Example 7 | 10 | 5 | Remainder | 0.5 | 30 | FIG. 29 | 1823 ± 135 |
| Example 8 | 5 | 5 | Remainder | 1 | 30 | FIG. 30 | 1038 ± 38 |
| Example 9 | 10 | 5 | Remainder | 1 | 30 | FIG. 31 | 1553 ± 94 |

Test Example 1

A polycaprolactone having a number average molecular weight of 2000 (also referred to as "2k PCL" in Test Example 1) as measured by gel permeation chromatography method and a polycaprolactone having a number average molecular weight of 80000 (also referred to as "80k PCL" in Test Example 1) as measured by gel permeation chromatography method were provided.

2k PCL and 80k PCL were dissolved in 1,1,1,3,3,3-hexafluoro-2-propanol (HFIP) in such a manner that the blend ratios and the concentrations shown in Table 2 could be achieved. In this manner, compositions for electrospinning were prepared.

TABLE 2

| Sample name | Blend ratio of PCLs (w/w %) | | Total PCL concentration in HFIP (w/v %) |
|---|---|---|---|
| | 80k PCL | 2k PCL | |
| 2k-F0 | 100 | 0.0 | 5.0 |
| 2k-F33 | 67 | 33 | 7.5 |
| 2k-F50 | 50 | 50 | 10 |
| 2k-F67 | 33 | 67 | 15 |
| 2k-F75 | 25 | 75 | 20 |
| 2k-F80 | 20 | 80 | 25 |

[Amendment Under Rule 91 27.12.2019]

The compositions for electrospinning shown in Table 2 were spun in the same manner as in Example 1 using an electrospinning device shown in FIG. 1 to produce sheet-like non-woven fabrics. A needle (22 G) was used as an ejection device, the distance between the needle and a target electrode was 13 cm, and an ejection speed was 1.0 mL/h. The voltage to be applied was 20 kV

[Observation with Scanning Electron Microscope]

Figure 32:
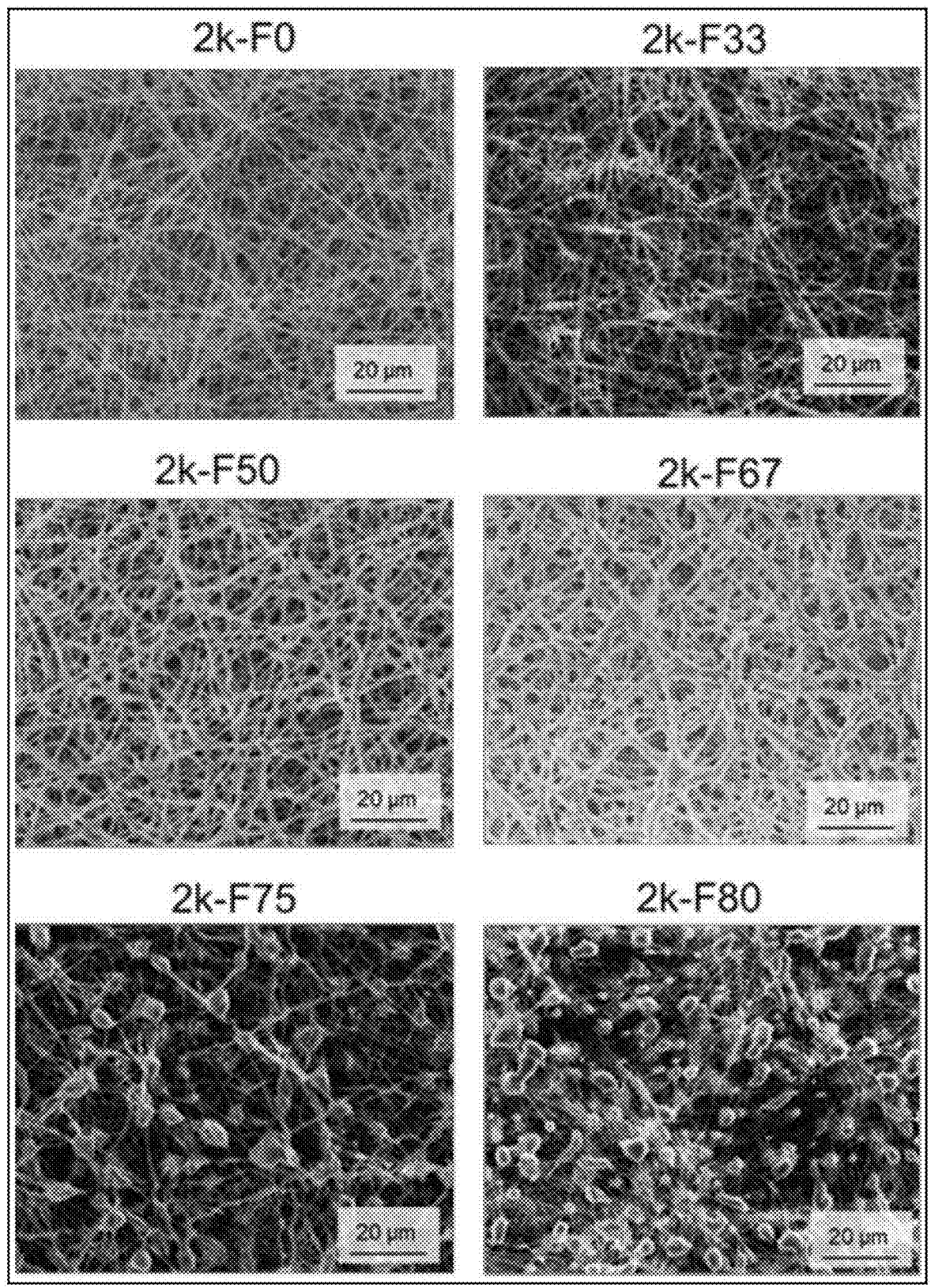
FIG. 32 shows scanning electron micrographs of non-woven fabrics produced in of Test Example 1.

Scanning electron micrographs of the non-woven fabrics thus produced are shown in FIG. 32. In 2k-F0 which contained only 80k PCL, a smooth fiber structure was formed. In contrast, in the case where the content ratio of 2k PCL was larger than 75 w/w % (2k-F75, 2k-F80), bead-like fibers were observed. Furthermore, the fiber diameter increased with the increase in the content ratio of 2k PCL (2K-F33: 600±242 nm, 2k-F50: 1136±39 nm, 2k-F67: 2774±174 nm). In the case where the content ratio of 2k PCL was 100 w/w %, droplets were formed and any fiber structure was not formed.

[Evaluation of Biodegradability (37° C.)]

Each of the non-woven fabrics thus prepared was cut into a piece having a weight of 3 to 5 mg, and the sample was immersed in a 3M aqueous NaOH solution at 37° C. The sample was washed with water twice after 1 hour, after 3 hours, after 6 hours and after 16 hours, and the sample was freeze-dried. The surface structures of the dried fibers and film were observed with a scanning electron microscope. The residual weight (%) was calculated from a sample weight per an initial weight at a certain decomposition period of time (1 hour, 3 hours, 6 hours, 16 hours). As sample for comparison use, cast films (2k-C0, 2k-C25, 2k-C33, 2k-C50) produced from the compositions shown in Table 3 in a conventional manner were used. Each of the cast films was also cut into a sample having a weight of 3 to 5 mg in the same manner as for the preparation of the non-woven fabrics, the sample was then immerse in 3M NaOH at 37° C., and the residual weight (%) was calculated from the weight of the sample after 1 hour, 3 hours, 6 hours and 16 hours.

TABLE 3

| Sample name | Blend ratio of PCLs (w/w %) | | Total PCL concentration in HFIP(w/v %) |
|---|---|---|---|
| | 80k PCL | 2k PCL | |
| 2k-C0 | 100 | 0.0 | 5.0 |
| 2k-C25 | 75 | 25 | 6.7 |
| 2k-C33 | 67 | 33 | 7.5 |
| 2k-C50 | 50 | 50 | 10 |

Figure 33:
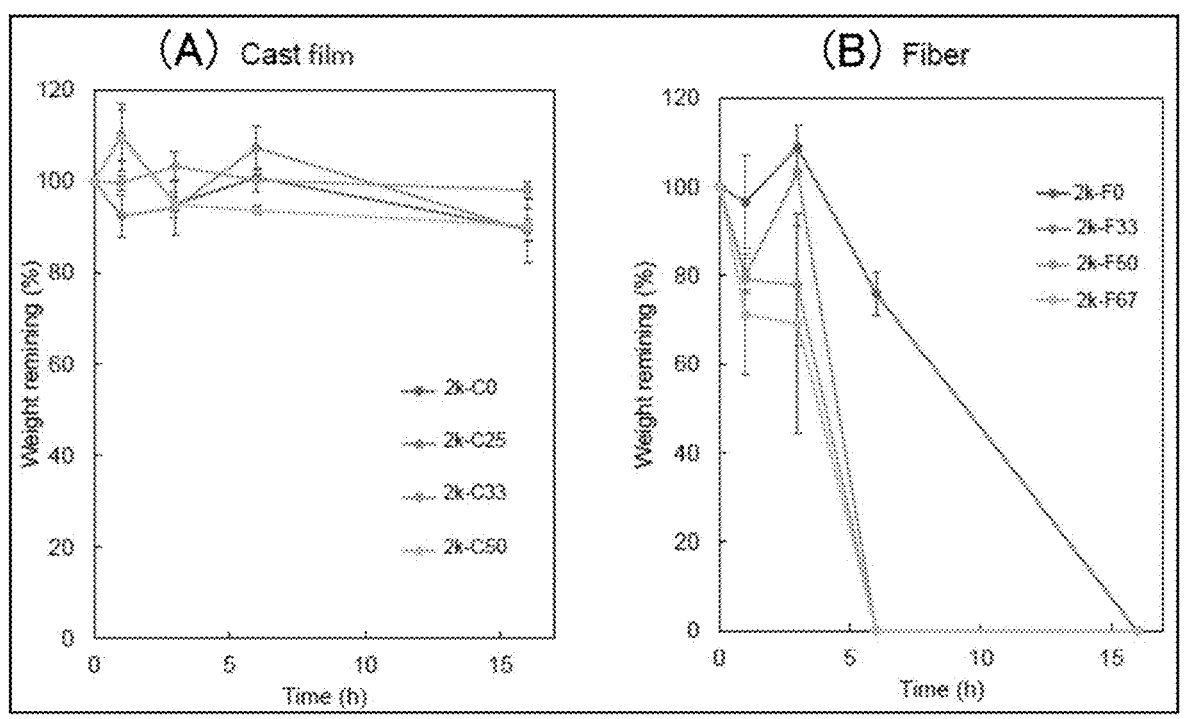
FIG. 33 shows the residual weights (%) of the non-woven fabrics and the cast films produced in Test Example 1 after the decomposition at 37° C.

The residual weights (%) of the cast films and the non-woven fabrics are shown in FIG. 33. The results for the cast films are shown in (A), and the results for the non-woven fabrics are shown in (B). The cast films showed weight losses of less than 10% after 16 hours regardless of the variations in the sample compositions. In contrast, the non-woven fabrics containing 2k PCL (2k-F33, 2k-F50, 2k-F67) were 100% decomposed after 6 hours. This is because fibers had a larger porosity and larger surface area. The decomposition was accelerated with the increase in the content ratio of 2k PCL.

Figure 34:
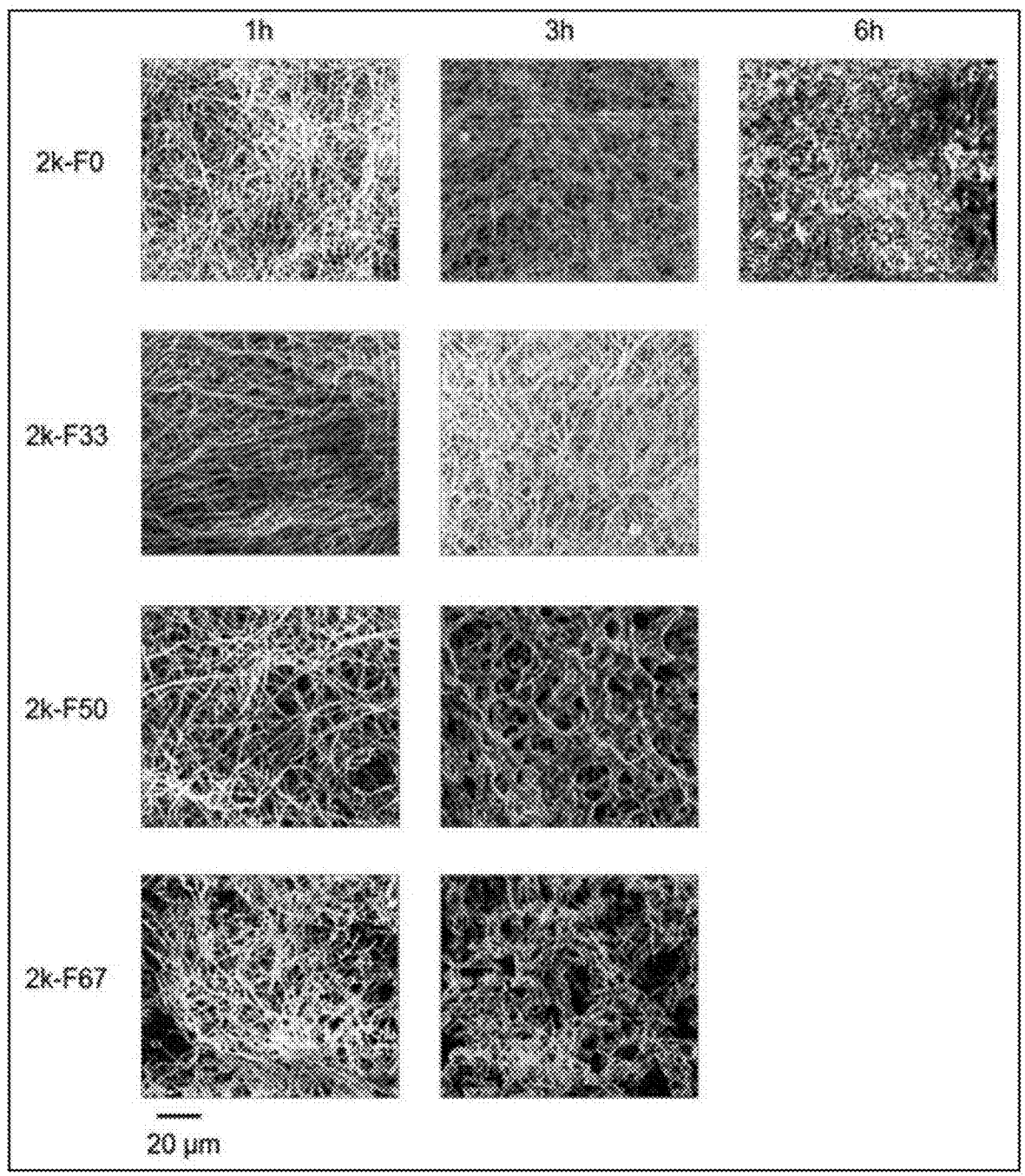
FIG. 34 shows scanning electron micrographs of the non-woven fabrics produced in of Test Example 1 after the decomposition at 37° C.

Scanning electron micrographs of the fiber structures of the non-woven fabrics after the decomposition test are shown in FIG. 34. In each of the non-woven fabrics containing 2k PCL, although a fibrous form was still observed after 3 hours, the net-like structure was brittle and was broken easily.

[Differential Scanning Calorimetry Measurement]

The non-woven fabrics thus produced were subjected to a differential scanning calorimetry (DSC) measurement. 80k PCL and 2k PCL were also subject to a differential scanning calorimetry measurement.

Figure 35:
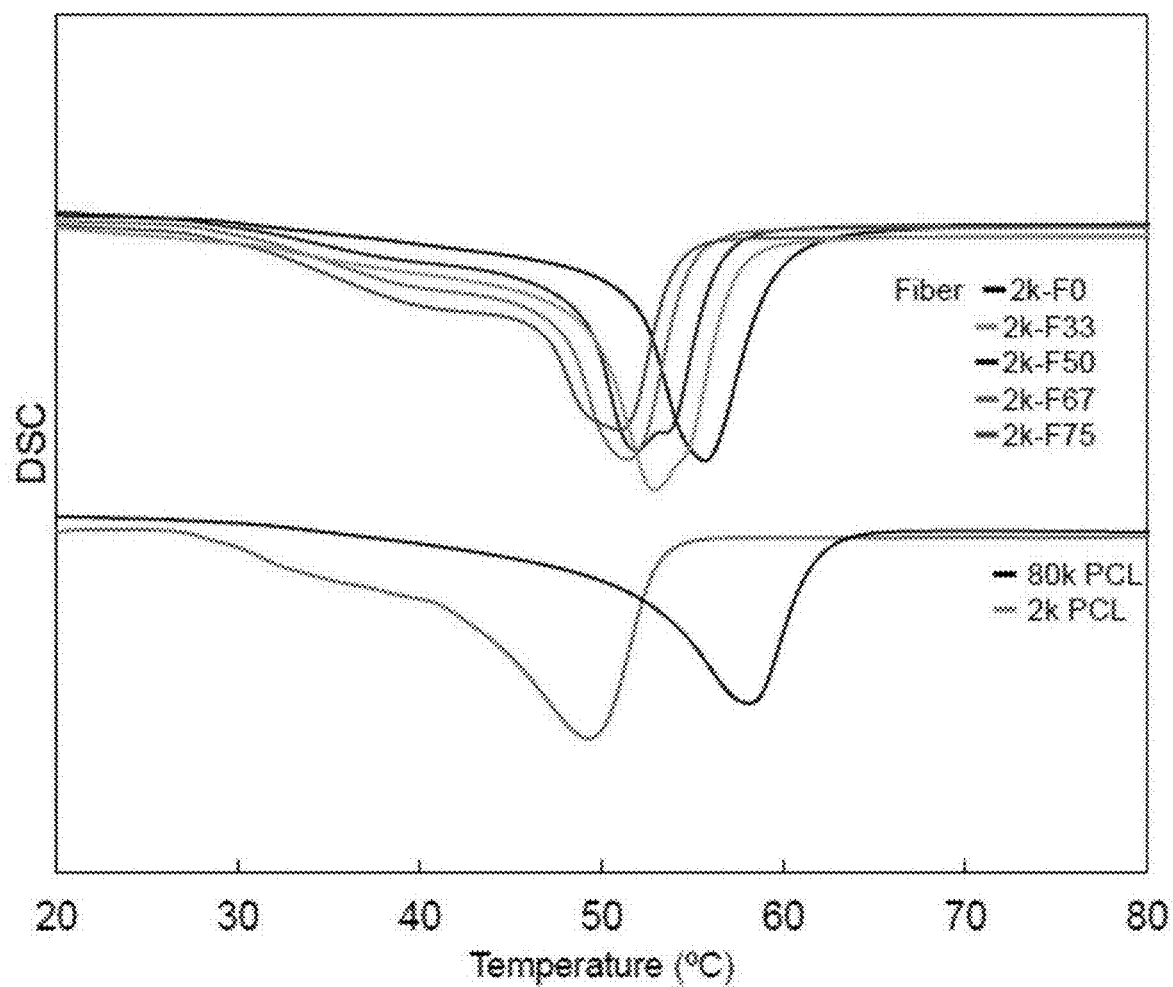
FIG. 35 shows the results of the measurement of differential scanning calorimetry (DSC) of the non-woven fabrics produced in Test Example 1.

The results are shown in FIG. 35. 80k PCL and 2k PCL showed melting points of 58° C. and 49° C., respectively. Each of the DCS curves of the non-woven fabrics was shifted to a lower temperature side with the increase in the content ratio of 2k PCL. Each of the DCS curves had two peaks. These results show that the crystallization of a PCL is interfered with the incorporation of a low-molecular-weight PCL and, as a result, the melting point is shifted to a lower temperature. Because a polymer having a lower melting point tends to be decomposed more rapidly, these results correspond well to the results of the decomposition test.

[Evaluation of Hydrophilicity]

In order to evaluate the hydrophilicity of each of the non-woven fabrics, one drop of water was applied on each of the non-woven fabrics and the cast films, and then the contact angle of the water droplet was measured.

Figure 36:
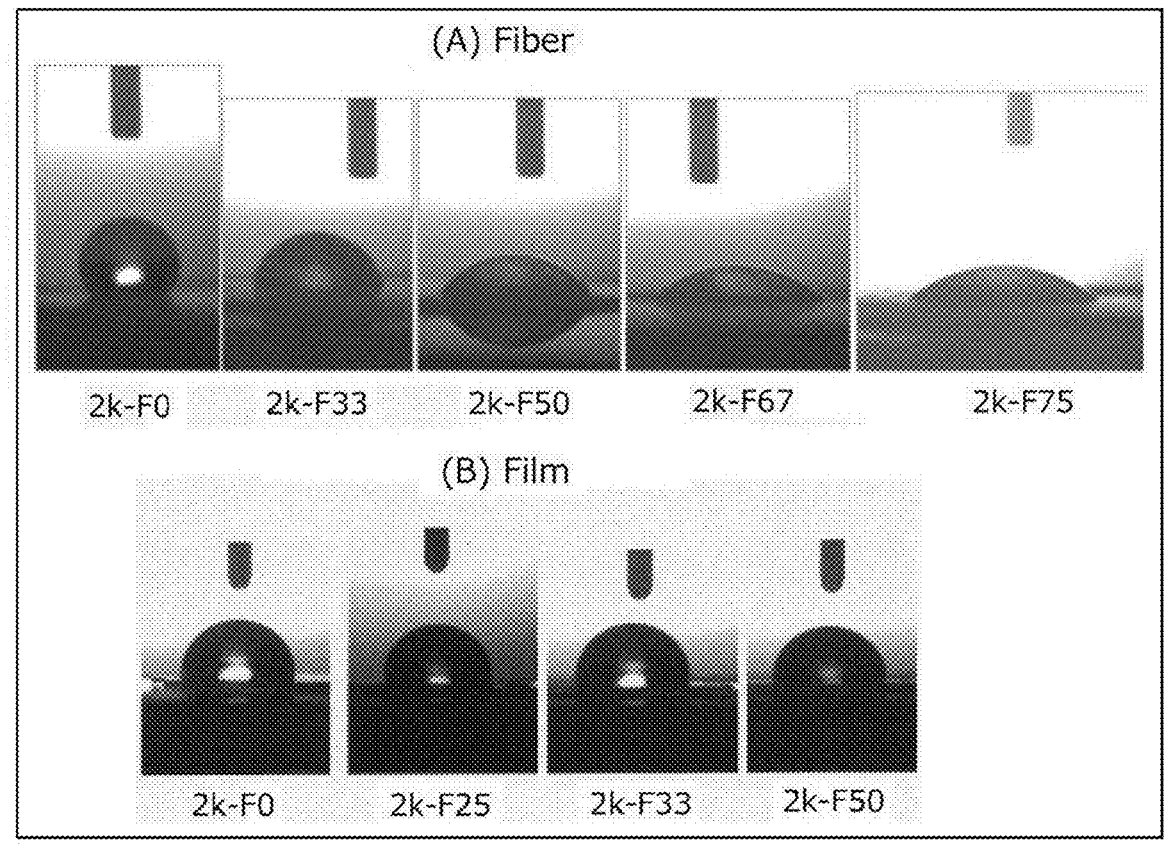
FIG. 36 shows photographs of water droplets wherein one drop of water is applied on each of the non-woven fabrics and the cast films produced in Test Example 1.
Figure 37:
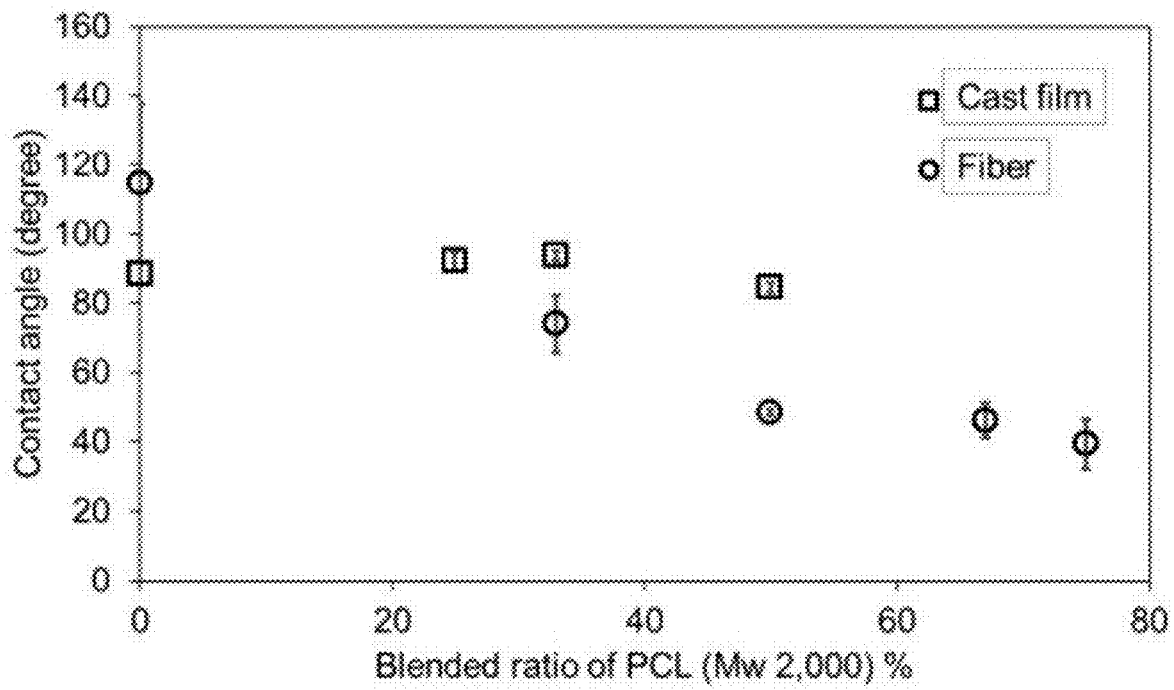
FIG. 37 shows contact angles of water droplets wherein one drop of water is applied on each of the non-woven fabrics and the cast films produced in Test Example 1.

The photographs of the droplets are shown in FIG. 36, and the contact angles measured are shown in FIG. 37. In each of the non-woven fabrics, the hydrophilicity increased and the contact angle decreased with the increase in the content ratio of 2k PCL. In contrast, in the cast films, the contact angles were almost the same as each other (about 89°) even when the content ratios of 2k PCL were increased.

Test Example 2

A polycaprolactone having a number average molecular weight of 108000 (an average value of n=2) (also referred to as "108k PCL" in Test Example 2) as measured by gel permeation chromatography method and a polycaprolactone having a number average molecular weight of 2690 (an average value of n=2) (also referred to as "2.7k PCL diol" in Test Example 2) as measured by gel permeation chromatography method was provided.

108k PCL and 2.7k PCL diol were dissolved in trifluoroethanol (TFE) in such a manner that the blend ratios and the concentrations shown in Table 4 could be achieved, and then methylcobalamin in an amount corresponding to 3% relative to the total amount of 108k PCL and 2.7k PCL diol was further added to the resultant solution. In this manner, compositions for electrospinning were prepared.

TABLE 4

| Sample name | Blend ratio of PCLs (w/w %) | | Total PCls concentration in TFE (w/w %) |
|---|---|---|---|
| | 108k PCL | 2.7k PCL diol | |
| 10:00 | 100 | 0 | 6.5 |
| 9:01 | 90 | 10 | 7.2 |
| 8:02 | 80 | 20 | 8.1 |
| 7:03 | 70 | 30 | 9.3 |
| 5:05 | 50 | 50 | 13.0 |

Each of the compositions for electrospinning thus prepared was spun using an electrospinning device shown in FIG. 1. A needle (27 G) was used as an ejection device, the distance between the needle and a target electrode was 17 cm, and an ejection speed was 0.5 mL/h. The voltage to be applied was 30 kV.

[Observation with Scanning Electron Microscope]

Figure 38:
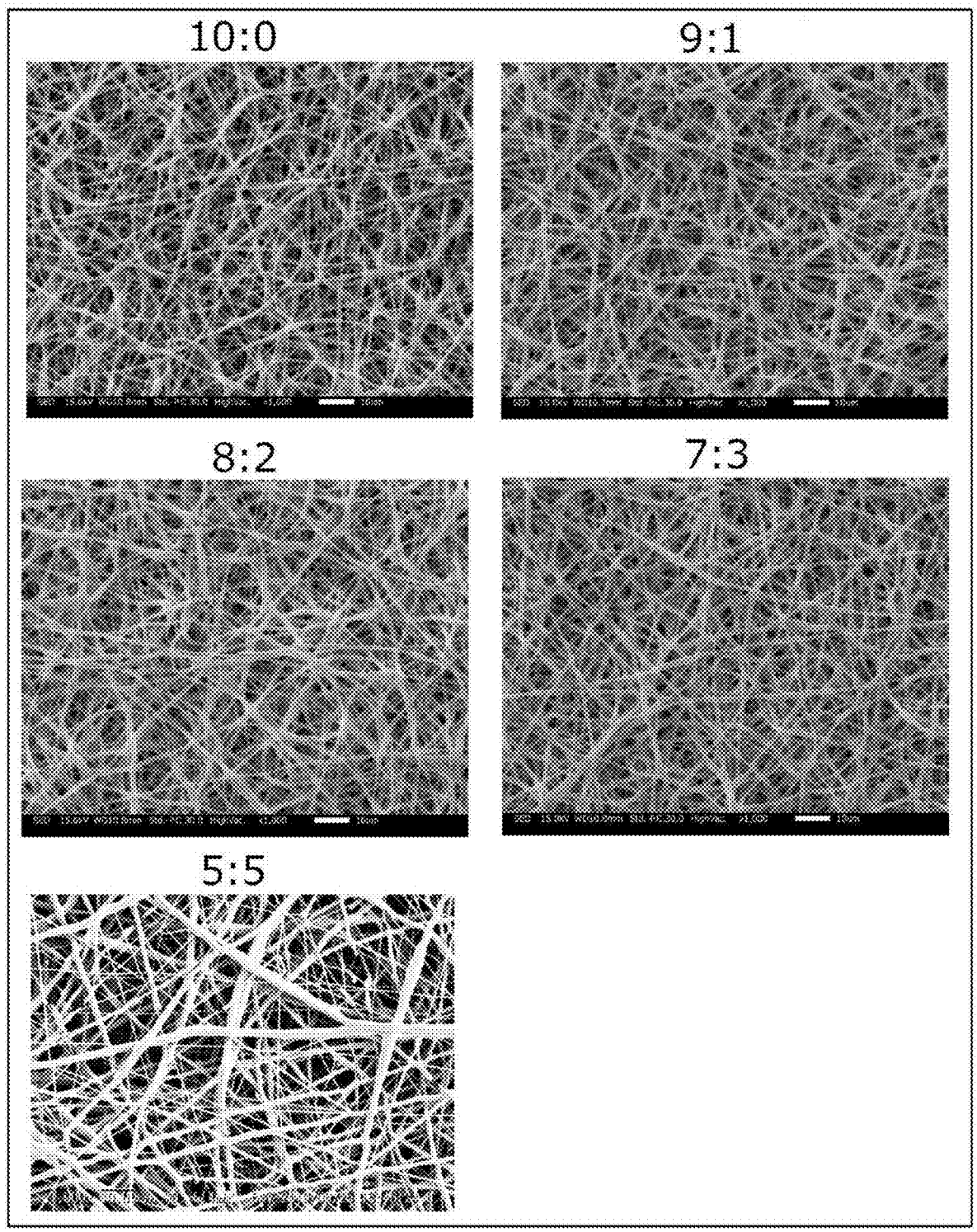
FIG. 38 shows scanning electron micrographs of non-woven fabrics produced in of Test Example 2.

The scanning electron micrographs of the non-woven fabrics thus prepared are shown in FIG. 38. With respect to each of the non-woven fabrics having the component compositions, the fiber diameters of 10 fibers were calculated from the electron micrograph and then the average fiber diameter was calculated as follows.

[10:0] 991.2 nm
[9:1] 963.7 nm
[8:2] 1083.5 nm
[7:3] 949.2 nm
[5:5] 1157.0 nm

[Evaluation of Biodegradability (37° C.)]

Each of the non-woven fabrics prepared was cut into a 2-square-centimeter piece (6 to 8 mg), and the piece was immersed at 37° C. in a 0.1M (sodium hydroxide)-(physiological saline) solution (250 mL). A sample was collected every several days. Each of the samples was washed with water 5 times and was then dried all night and all day under reduced pressure in the presence of phosphorus oxide. The decomposition rate (%) was calculated from a residual sample weight at the time point of the collection of a sample relative to the initial weight. The sample collection days for the samples of each of the non-woven fabrics having the component compositions are shown in Table 5.

TABLE 5

| Sample name | Day of collection (number of immersion days) | | | | | | | | | |
|---|---|---|---|---|---|---|---|---|---|---|
| | 0 | 4 | 6 | 8 | 10 | 11 | 14 | 16 | 18 | 23 | 25 |
| 10:0 | ○ | ○ | | ○ | | ○ | | | ○ | | ○ |
| 9:1 | ○ | ○ | | ○ | | ○ | | | ○ | ○ | |
| 8:2 | ○ | ○ | | ○ | | | ○ | ○ | ○ | | |
| 7:3 | ○ | ○ | | | ○ | ○ | | ○ | ○ | | |
| 5:5 | ○ | ○ | ○ | ○ | ○ | | ○ | | | | |

Figure 39:
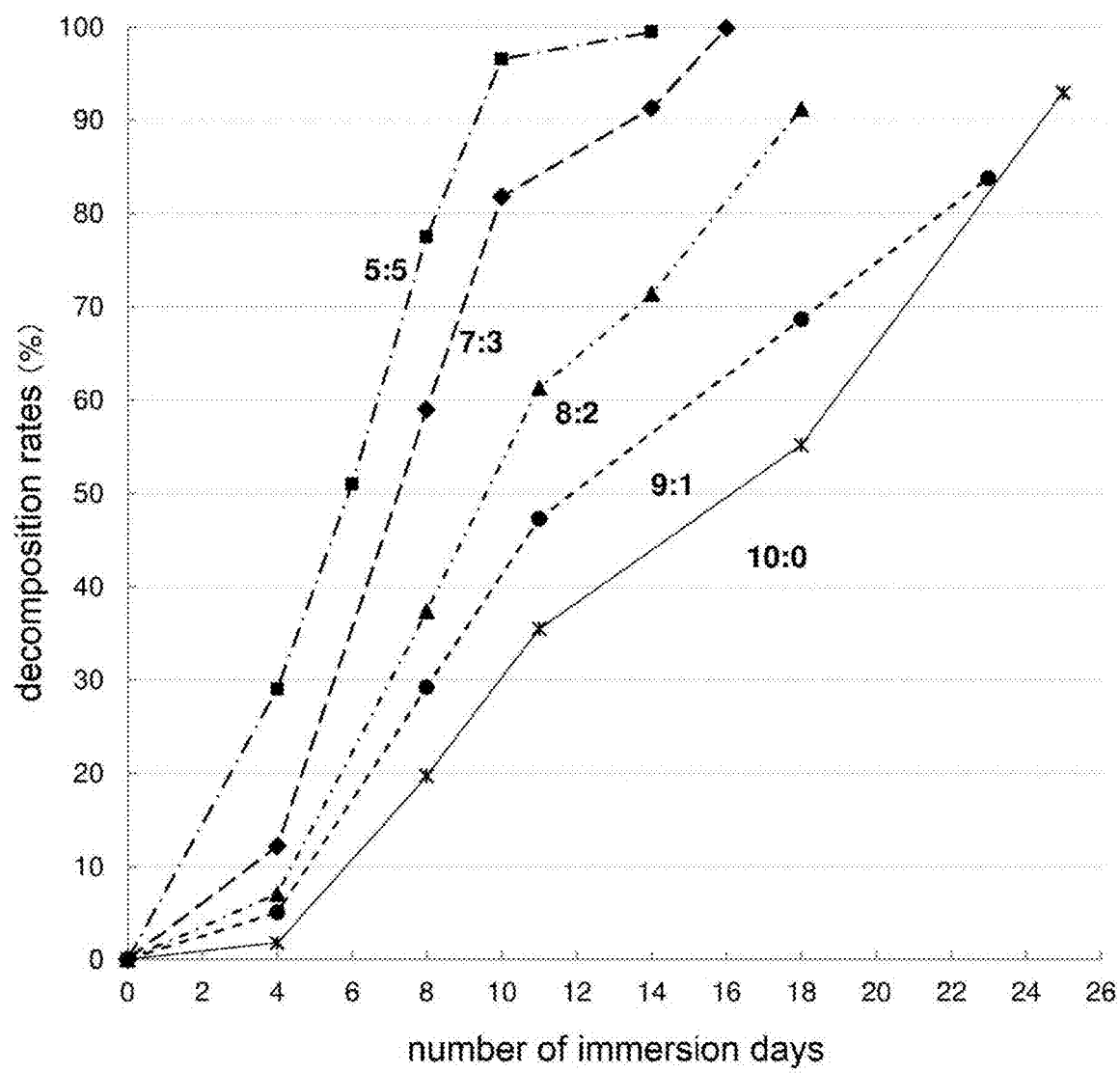
FIG. 39 shows decomposition rates (%) of the non-woven fabrics produced in Test Example 2 at 37° C.

The decomposition rates (%) of the non-woven fabrics are shown in FIG. 39. The decomposition rate on each of the sample collection days was an average of values determined in two samples (n=2). The decomposition was accelerated with the increase in the content ratio of 2.7k PCL diol. In contrast, with respect to "8: 2" and "9: 1" in each of which the content ratio of 2.7k PCL diol was small, the decomposition rate increased with the increase in the time of immersion. Therefore, it is assumed that these samples could be dissolved completely by prolonging the time of immersion. Therefore, by modifying the content ratios of both of the components, it becomes possible to produce a non-woven fabric which can retain the form thereof for a desired period in vivo and can be decomposed completely after a lapse of a desired time period.

REFERENCE SIGNS LIST

100 electrospinning device
101 ejection device
102 target electrode
103 voltage application device
104 fiber
105 non-woven fabric

The invention claimed is:
1. A non-woven fabric comprising a fiber including an aliphatic polyester that has at least two maximum values in a number average molecular weight distribution thereof,
wherein the aliphatic polyester has a first maximum value in a region lying between a number average molecular weight of 1500 and a number average molecular weight of 7000,
wherein the aliphatic polyester has a second maximum value in a region lying between a number average molecular weight of 70000 and a number average molecular weight of 150000, wherein the aliphatic polyester does not include polylactic acid and a copolymer containing a lactic acid unit, wherein the fiber has an average fiber diameter falling within the range of 100 to 3000 nm, and wherein the non-woven fabric is biodegradable.

2. The non-woven fabric according to claim 1, wherein the first maximum value is in a region lying between a number average molecular weight of 2000 and a number average molecular weight of 6000.

3. The non-woven fabric according to claim 1, wherein the second maximum value is in a region lying between a number average molecular weight of 70000 and a number average molecular weight of 90000.

4. The non-woven fabric according to claim 1, wherein the second maximum value is in a region lying between a number average molecular weight of 80000 and a number average molecular weight of 140000.

5. The non-woven fabric according to claim 1, wherein any polymeric compound other than the aliphatic polyester is not substantially contained.

6. The non-woven fabric according to claim 1, wherein the non-woven fabric is produced by electrospinning a composition containing aliphatic polyesters having different maximum values from each other in number average molecular weight distributions thereof.

7. The non-woven fabric according to claim 6, wherein, when an aliphatic polyester having a maximum value positioned on a lowest molecular weight side among the aliphatic polyesters contained in the composition is defined as a lower-molecular-weight component and an aliphatic polyester having a maximum value positioned on a highest molecular weight side among the aliphatic polyesters contained in the composition is defined as a higher-molecular-weight component, a content mass ratio of a content of the lower-molecular-weight component to a sum total of the content of the lower-molecular-weight component and a content of the higher-molecular-weight component in the composition is more than 0.33 and less than 0.75.

8. The non-woven fabric according to claim 6, wherein, when an aliphatic polyester having a maximum value positioned on a lowest molecular weight side among the aliphatic polyesters contained in the composition is defined as a lower-molecular-weight component and an aliphatic polyester having a maximum value positioned on a highest molecular weight side among the aliphatic polyesters contained in the composition is defined as a higher-molecular-weight component, a content mass ratio of a content of the lower-molecular-weight component to a sum total of the content of the lower-molecular-weight component and a content of the higher-molecular-weight component in the composition is 0.05 or more and less than 0.75.

9. The non-woven fabric according to claim 6, wherein, when an aliphatic polyester having a maximum value positioned on a lowest molecular weight side among the aliphatic polyesters contained in the composition is defined as a lower-molecular-weight component and an aliphatic polyester having a maximum value positioned on a highest molecular weight side among the aliphatic polyesters contained in the composition is defined as a higher-molecular-weight component, a content mass ratio of a content of the lower-molecular-weight component to a sum total of the content of the lower-molecular-weight component and a content of the higher-molecular-weight component in the composition is 0.1 or more and less than 0.25.

10. The non-woven fabric according to claim 1, wherein the non-woven fabric further comprises a drug.

11. A method for producing the non-woven fabric according to claim 1, comprising a step of electrospinning a composition which contains an aliphatic polyester having at least two maximum values in a number average molecular weight distribution thereof and a solvent, wherein the aliphatic polyester has a first maximum value in a region lying between a number average molecular weight of 1500 and a number average molecular weight of 7000, wherein the aliphatic polyester has a second maximum value in a region lying between a number average molecular weight of 70000 and a number average molecular weight of 150000, and wherein the aliphatic polyester does not include polylactic acid and a copolymer containing a lactic acid unit, to produce a non-woven fabric which comprises a fiber including the aliphatic polyester and having an average fiber diameter falling within the range of 100 to 3000 nm.

12. The method for producing the non-woven fabric according to claim 11, comprising a step of mixing aliphatic polyesters having different maximum values from each other in molecular weight distributions thereof with the solvent to produce the composition.

* * * * *